(12) United States Patent
Williams

(10) Patent No.: US 6,735,593 B1
(45) Date of Patent: May 11, 2004

(54) SYSTEMS AND METHODS FOR STORING DATA

(75) Inventor: Simon Guy Williams, The Birches, Littleworth Road, Burnham, Buckinghamshire Sl. 1 8PF (GB)

(73) Assignee: Simon Guy Williams (GB)

( * ) Notice: Subject to any disclaimer, the term of this patent is extended or adjusted under 35 U.S.C. 154(b) by 0 days.

(21) Appl. No.: 09/436,573

(22) Filed: Nov. 9, 1999

Related U.S. Application Data

(60) Provisional application No. 60/108,078, filed on Nov. 12, 1998.

(51) Int. Cl.[7] ............................................. G06F 17/30
(52) U.S. Cl. ............................. 707/102; 707/5; 704/2; 704/9
(58) Field of Search ..................... 707/1–5, 100–104.1; 704/2–9; 709/223, 102

(56) References Cited

U.S. PATENT DOCUMENTS

| | | | |
|---|---|---|---|
| 5,687,367 A | 11/1997 | Dockter et al. | 707/102 |
| 5,787,442 A | 7/1998 | Hacherl et al. | 707/201 |
| 5,809,297 A | * 9/1998 | Kroenke et al. | 707/102 |
| 5,826,259 A | 10/1998 | Doktor | |
| 6,035,300 A | * 3/2000 | Cason et al. | 345/762 |

FOREIGN PATENT DOCUMENTS

| | | |
|---|---|---|
| WO | WO 97/15015 | 4/1997 |

OTHER PUBLICATIONS

Korth et al., "Database system concepts" second edition, 1991.*

Bracchi et al., "Binary Logical Associations in Data Modelling", Modelling in Data Base Management Systems G.M. Nijssen, (ed); North Holland Publishing Company: pp. 125–147 (1976).

Frost: "ASDAS– A Simple Database management System", Proc. Of the 6th ACM Euro. Reg. Conf. IPC, Bus Press. pp. 234–240 (1981).

Frost: "Binary–Relational Storage Structures", The Computer Journal 25(3): 358–367 (1982).

King et al., "TriStarp– An Investigation into the Implementation and Exploitation of Binary Relational Storage Structures", Proc. 8th BNCOD(British National Conference On Data Bases), pp. 64–84 (York 1990).

Mariani, J. A., "Oggetto: An Object Oriented Database Layered on a Triple Store", The Computer Journal 35(2): 108–118 (1992).

Mariani, J. A., "Implementation of General Purpose Database Package", Implementation of Small Computer System , Pub. Ellis Horwood , Chap.3, pp. 39–58 (1989).

Roussopoulos, N. and Mylopoulos, J. "Using Semantic Networks for Data Base Management", Proc. Of the 1st VLDB Conf., Framingham, pp. 144–172 (1975).

Sharman, H. C. G. and Winterbottom N. "The Universal Triple Machine: A Reduced Instruction Set Repository Manager", Proc. Of BNCOD–6, pp. 188–213 (1988).

* cited by examiner

*Primary Examiner*—John Breene
*Assistant Examiner*—Mohammad Ali
(74) *Attorney, Agent, or Firm*—Kevin A. Oliver; Foley Hoag LLP

(57) ABSTRACT

The system and methods described herein relate to novel database architectures useful for storing data in versatile formats that can be utilized by a wide range of software applications. The architecture enables data to be entered as a number of entities, a number of nexuses between the entities, and a number of nexuses between nexuses and entities.

40 Claims, 14 Drawing Sheets entity type         Associative Model query result set

Query Result Set

SYSTEMS AND METHODS FOR STORING DATA

This application is based on U.S. Provisional Application No. 60/108,078, filed Nov. 12, 1998.

BACKGROUND OF THE INVENTION

1. Field of the Invention

This application relates to systems and methods for storing electronic data, more particularly to database architecture.

2. Description of Related Art

At the heart of many modern computer systems lies a vital software component called a database management system, whose function is to store and retrieve data. Database management systems range in scale from the simple file manager found on every personal computer to highly complex systems spanning many computers, capable of storing huge volumes of data and affording simultaneous access to thousands of users.

Three approaches to database management and architecture were proposed and developed in the late—1960s and early 1970s: the network model, the hierarchical model and the relational model. The relational model won the race to achieve widespread commercial acceptance, and today, together with SQL, its data sub-language, it is the standard used by transaction processing and information systems throughout commerce, industry and government. The network model and the hierarchical model achieved some early commercial success, but then largely fell by the wayside, although implementations of both are still in use today in some mainframe installations.

In the late 1980s and early 1990s, the object model of data emerged as the single modern challenger to the relational model. The object model first appeared as an adjunct to object-oriented programming languages, in response to the need for computer-aided design applications to store complex diagrams. During the 1990s, the role of object orientation expanded from its origin as a better programming methodology to a guiding philosophy for a wide range of software and business disciplines. Proponents of the object model of data exploited this wave of enthusiasm to build a strong market profile, and for a brief period the object model was widely perceived as the successor to the relational model.

Many of the established relational database vendors have begun to incorporate some features of the object model into their relational products. These hybrid systems—often called Universal Servers—are described as object/relational, and some commentators argue that this represents the next major data model, while others argue that they are still predominantly relational, with a few of the features of the object model somewhat inelegantly grafted on.

A frequently cited limitation of the relational model is its inability to deal with complex data structures such as text, sounds, and images that are typical of multimedia applications. However, the relational model perpetuates three much more fundamental limitations in programming practice that the market has yet to challenge, even though these limitations significantly increase the cost of computer systems and constrain their ability to enhance competitive edge. These three limitations are:

1. Most new relational database applications need a new set of programs written from scratch, because a program written to use one database design may not be reused with another. This creates a need for a never-ending supply of new programs, the development and maintenance of which is labour-intensive and expensive.
2. Relational database applications have difficulty recording a piece of information about an individual thing that is not relevant to every other thing of the same type, so applications have to store the same information about every customer, order, product and so on. This restriction may limit the ability to continually improve the quality of customer service, because relational database applications often are unable to record and take account of the needs of individual customers.
3. In the relational world, identical types of information in two databases may be incompatible: a customer in one database may have different columns in a different order from a customer in another database. Consequently it is difficult, and often impossible, to amalgamate two databases or develop applications that use information from many databases.

A data management system which solves these and other problems will allow a more unified approach to programming, increase the utility of databases, and foster new growth in computational possibilities.

SUMMARY OF THE INVENTION

The present invention relates to a database architecture, referred to herein as the associative model, which stores data as a web of items, relationships between items, relationships between relationships and items, and relationships between relationships and relationships. Using the associative model, it is possible to reuse applications with different databases, merge databases easily, and store data about a wide variety of items without restraints inherent in the relational model.

Thus, in one embodiment, the invention provides a system for storing data, including a plurality of entities, and a plurality of relationships, each relationship defining a nexus between at least two entities. In certain embodiments, each entity is associated with a unique identifier. In certain embodiments, each relationship is associated with a unique identifier.

In certain embodiments, the system further includes a plurality of qualifiers, each qualifier defining a nexus between an entity and a relationship or between two relationships. In certain embodiments, the plurality of qualifiers includes a correcting qualifier which defines one relationship as correcting a previous relationship. In certain embodiments, the plurality of qualifiers includes an updating qualifier which defines one relationship as updating a previous relationship, e.g., by including a time from which the updating qualifier is effective.

In certain embodiments, the plurality of entities includes an entity representing an abstract category. In certain such embodiments, the plurality of relationships includes a relationship defining a nexus between at least two abstract categories.

In certain embodiments, each entity represents a unique entity. In other embodiments, two entities which represent one unique entity are related by an relationship which defines the nexus between the two entities, such as equivalence.

In another aspect, the present invention relates to a system for storing data, having a plurality of items, each item representing an entity or a verb, and a plurality of links, each link representing an association defined by a verb and at least two entities. In certain embodiments, each item and each link is associated with a unique identifier.

In certain embodiments, the method further comprises a plurality of qualifying links, each qualifying link representing an association defined by a verb, a link, and an entity or by a verb and two links. In certain embodiments, the plurality of qualifying links includes an updating qualifying link which defines an existing link as being superseded by a subsequent link, e.g., by indicating a time at which the updating qualifying link takes effect.

In certain embodiments, the plurality of items includes an item representing an abstract category. In certain such embodiments, the plurality of links includes a link representing an association defined by a verb and at least two items representing abstract categories.

In certain embodiments, each item represents a unique entity or verb. In certain other embodiments, two items which represent one unique entity are included in a link which includes a verb that defines the nexus between the two entities, such as equivalence.

In another aspect, the invention relates to method for storing data by providing a plurality of entities, and creating a plurality of relationships, each relationship defining a nexus between at least two entities. In certain embodiments, the method further includes assigning to each entity a unique identifier. In certain embodiments, the method further comprises assigning to each relationship a unique identifier.

In certain embodiments, the method further includes creating a plurality of qualifiers, each qualifier defining a nexus-between an entity and a relationship or between two relationships. In certain embodiments, creating a plurality of qualifiers includes creating a correcting qualifier which defines one relationship as correcting a previous relationship, e.g., by defining one relationship as updating a previous relationship, such as by assigning a time from which the updating qualifier is effective.

In certain embodiments, creating a plurality of entities includes creating an entity representing an abstract category. In certain such embodiments, creating a plurality of relationships includes creating a relationship defining a nexus between at least two abstract categories.

In certain embodiments, the method includes creating a relationship between two entities which represent one unique entity, e.g., by defining the two entities as equivalent.

In another aspect, the invention provides a method for storing data by providing a plurality of items, each item representing an entity or a verb, and creating a plurality of links, each link representing an association defined by a verb and at least two entities. In certain embodiments, the method further includes assigning to each item and to each link a unique identifier.

In certain embodiments, the method further includes creating a plurality of qualifying links, each qualifying link representing an association defined by a verb, a link, and an entity or by a verb and two links. In certain embodiments, creating a plurality of qualifying links includes creating an updating qualifying link which defines one link as being superseded by a subsequent link, e.g., by creating a temporal qualifying link which indicates a time at which the updating qualifying link takes effect.

In certain embodiments, creating a plurality of items includes creating an item representing an abstract category. In certain such embodiments, creating a plurality of links includes creating a link representing an association defined by a verb and at least two items representing abstract categories.

In certain embodiments, the method further includes linking two items which represent one unique entity by a link which includes a verb that defines the nexus between the two entities, e.g., by defining the two entities as equivalent.

BRIEF DESCRIPTION OF THE FIGURES

The following figures depict certain illustrative embodiments of the invention in which like reference numerals refer to like elements. These depicted embodiments are to be understood as illustrative of the invention and not as limiting in any way.

DETAILED DESCRIPTION OF THE ILLUSTRATED EMBODIMENTS

The description below pertains to several illustrative embodiments of the invention. Although many variations of the invention may be envisioned by one skilled in the art, such variations and improvements are intended to fall within the compass of this disclosure. Thus, the scope of the invention is not to be limited in any way by the disclosure below.

Figure 1:
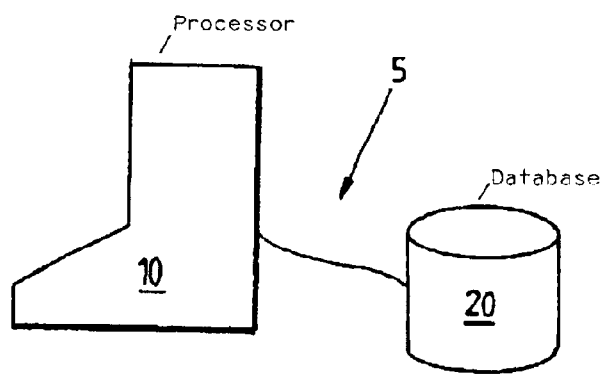
FIG. 1 depicts a computer system including a database according to the present invention.

The systems and methods described herein relate to a database architecture, the associative model, which stores and manipulates data based, in part, on the nexuses between entities as they exist in the real world. As shown in FIG. 1, a database 20 may be used with a processor 10 or other computer platform to form a system 5 for storing and manipulating data. Processor 10 can be any suitable data processing platform including a conventional IBM PC work station operating the Windows operating system, or a SUN work station operating a version of the Unix operating system, or any other suitable workstation.

Figure 2:
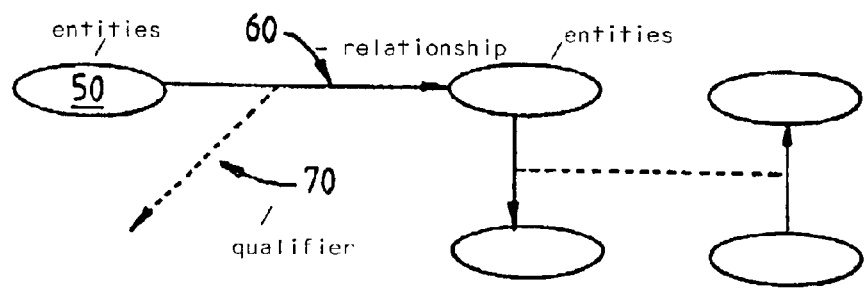
FIG. 2 presents a schematic depiction of the data structure according to one embodiment of the present invention.

A general schematic diagram for the organization of the stored data is depicted in FIG. 2, which shows exemplary nexuses between entities 50, relationships 60, and qualifiers 70. An entity may refer to a noun, i.e., a person, place, or thing, including abstract concepts and categories, which does not rely on another entity to exist. For example, a person is an entity, but a customer relies on a vendor to exist, and a marriage relies on two people to exist. The associative model may store entities as discrete entries in the database, or may employ any technique compatible with the systems and methods described herein. In certain embodiments, each entity may be associated with a unique identifier, such as a numerical code, used to distinguish the entity from all other entries in the database, even though the name or label of the entity may change. Thus, the unique identifier may be invariable for each entity.

The associative model also stores relationships 60, which define nexuses between entities 50. For example, given the entities "Elaine" and "Monk's Diner", a relationship might be "Elaine eats at Monk's Diner", or "Elaine is a customer of Monk's Diner". The words connecting the two entities function as a verb. A verb, as the term is used herein, is a word or series of words that can describe a nexus between two or more entities. Thus, a verb, as used herein, refers not only to verbs as they are commonly understood, such as "is" and "likes" and "has", but also prepositions, such as "on" and "in" and "for", conjunctions, such as "while" and "before", and verb phrases, such as "eats at" and "is a customer of". In certain embodiments, the associative model may store verbs as entries, as described above for entities. In particular embodiments, each verb may be associated with a unique identifier, as described above. Both verbs and entities may be stored using the same format, and the term 'item' is used herein to refer to both verbs and entities.

In one embodiment, a relationship may be stored as an association between a subject entity (source entity), a verb, and an object entity (target entity). The relationship may itself be given a unique identifier, as described above, to distinguish the relationship from all other relationships. A relationship, which is one type of association used by the associative model, may thus be stored as a discrete entry within the database. An association, as the term is used herein, is an entry that defines a nexus between two or more entries in the database. Thus, as in method 100 depicted in FIG. 3, data can be entered into a database by storing a plurality of entities 110 and defining nexuses between entities 120, such as by using relationships or other links as described above.

Figure 3:
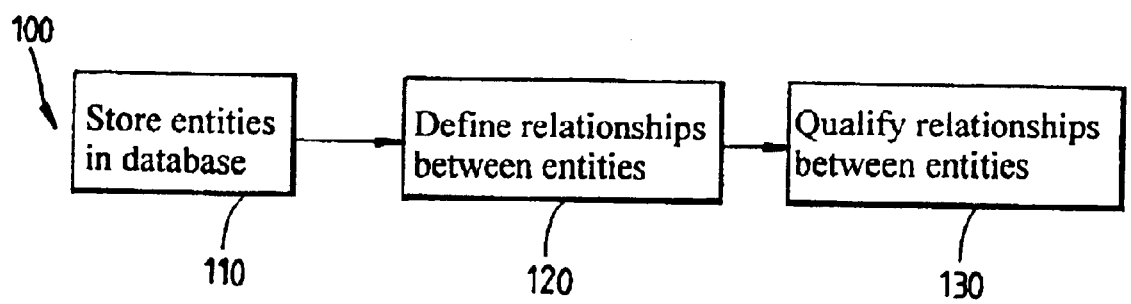
FIG. 3 illustrates a method for building a database according to the present invention.

Furthermore, as shown in FIG. 3, the associative model enables the user to qualify nexuses between entities 130. For example, "Elaine eats at Monk's" may be further modified by phrases such as "on Tuesdays", "for lunch", "with Jerry", or "orders the big salad". As depicted in FIG. 2, entries which modify relationships 60 in this manner are termed 'qualifiers' 70 herein, and generally refer to associations between a subject relationship, a verb, and a target entity; a subject entity, a verb, and a target relationship; or a subject relationship, a verb, and a target relationship, although qualifiers which define nexuses between three or more entities may be included in certain embodiments, as will be apparent to one of skill in the art. Qualifiers may be used to store nexuses such as "Elaine eats at Monk's while Carl fumigates the apartment" and "George watches the Mets play the Orioles". The verbs for the preceding qualifiers have been underlined for clarity. Each qualifier in a database may be associated with a unique code, as described above.

In one embodiment, both relationships 60 and qualifiers 70 are stored in similar manners, and are together referred to as links, as the term is used herein. For example, in embodiments wherein each item, each qualifier, and each relationship has a unique code, a link may associate the unique codes for a verb, an entity, and a relationship, or a verb, a relationship, and another relationship, etc. Each link may be associated with a unique code, permitting nexuses to be defined or interrelated ad nauseam.

In certain embodiments, the structure of the data in the database may be represented at varying levels of abstraction, to describe basic, recurring, or important types of nexuses. For example, if the database stores information about many people's dining habits, abstract entities of "person" and "restaurant" may be entered, and a relationship such as "person eats at restaurant" entered. Such abstract entities may be used as categories to group or organize items in the database. Additionally, nexuses defining particular instances of an abstract entity may be entered, such as "Elaine is a diner" and "Monk's Diner" is a restaurant. In this way, "Elaine eats at Monk's Diner" and "Jerry eats at Babu's" can be categorized as instances of the general nexus type of "diner eats at restaurant". These general nexuses of data, or metadata, allow convenient organization and use of the data stored in the database. Furthermore, metadata can exist at any number of levels. For example, "a diner is a person", "a restaurant is a business", "'eats at' is a subset of 'is a customer of'", and "a person is a customer of a business" can be entered to organize the information about many people's dining habits within a database that includes information about a number of customer-business relations. Using such techniques, one of skill in the art can tailor the structure of the database to suit specific and general needs for any situation.

In certain embodiments, any unique entity occurs once and only once in the database, accompanied by its unique code. Thus, in order to add the relationship "Elaine is Jerry's friend", the same unique codes can be used as in "Elaine eats at Monk's Diner" and "Jerry eats at Babu's". Thus, aspects of individual entities can be kept in close association, rather than being fragmented throughout a database, and a new relationship of an entity is kept in proper association with all other relationships of that entity.

Two databases can be easily merged with each other using the associative model. In one embodiment, the data in two databases may simply be combined. Two entries representing a single unique entity, one having derived from each of the merged databases, can be linked by a verb such as "is the same as" to establish that a single unique entity is the subject or object of all associations involving either entry. The database may then treat these two entries as equivalent, the database may replace the unique codes associated with one of the two entries with the unique code of the other entry, such that only one entry remains, or the database may treat the two entries in any other suitable manner as will be apparent to one of skill in the art.

In one embodiment, entries are not deleted, but rather superseded by subsequent entries. For example, if the database contains a relationship "Elaine eats at Monk's Diner" with the qualifier "on Tuesdays", the qualifier may be changed to "on Thursdays" by one or more links, e.g., a link designating the old qualifier as expired and a link adding the new qualifier, a link adding the new qualifier and a link defining the old qualifier as superseded by the new qualifier, etc. In one embodiment, the verb "eats at" may be defined as qualified by only a single time, and the addition of the new qualifier may logically delete the old qualifier automatically. In this way, qualifiers may be used to either correct or update information stored in the database without destroying any of its contents or obscuring the history of the database.

The database may, upon logical or explicit deletion or superseding of the old qualifier, qualify the old qualifier with one or more qualifiers to designate the old qualifier as having been deleted, having been deleted at a certain time, etc. In certain embodiments, the database may additionally store information representative of the time a link, item, or both was added. By this technique, or any other technique apparent to one of skill in the art, the content of the database at any particular time within the lifetime of the database may be reconstructed, because the times of addition and deletion of each item, link, or both are stored in the database.

One embodiment of the invention is described in greater detail in the following example.

The Associative Model

In the associative model, a database comprises two types of data structures:

Items, each of which has a unique identifier, a name and a type.

Links, each of which has a unique identifier, together with the unique identifiers of three other things, that represent the source, verb and target of a fact that is recorded about the source in the database. Each of the three things identified by the source, verb and target may each be either a link or an item.

Let's see how the associative model would use these two structures to store the piece of information "Flight BA1234 arrived at London Heathrow on Dec. 12, 1998 at 10:25am". There are seven items: the four nouns Flight BA1234, London Heathrow, Dec. 12, 1998 and 10:24am, and the three verbs arrived at, on and at. We need three links to store the data. They are:

> Flight BA1234 arrived at Heathrow Airport
> ... on 12-Aug-98
> ... at 10:25 am The first link is the first line. It uses the verb arrived at to associate the items Flight BA1234 and Heathrow Airport. The second link is the first and second lines combined. It uses the verb on to associate the first link and the item Aug. 12, 1998. (A link that begins with an ellipsis " . . . " has the previous link as its source.) The third link comprises all three lines. It uses the verb at to associate the second link and the item 10:25am.

Sometimes when writing links, instead of using new lines to show each link it is more convenient to keep going in a long string. When we do this, we simply put brackets around each link. Written this way, our example would look like this:

((Flight BA1234 arrived at Heathrow Airport) on Aug. 12, 1998) at 10:25am

If we see the associative model in the context of the relational model, we can store any associative database in just two relations: one for items and one for links. We give each item and link a meaningless number as an identifier, to act as its primary key.

| Items | |
|---|---|
| Identifier | Name |
| 77 | Flight BA1234 |
| 08 | London Heathrow |
| 32 | 12-Aug.-1999 |
| 48 | 10:25 am |
| 12 | arrived at |
| 67 | on |
| 09 | at |

| Links | | | |
|---|---|---|---|
| Identifier | Source | Verb | Target |
| 74 | 77 | 12 | 08 |
| 03 | 74 | 67 | 32 |
| 64 | 03 | 09 | 48 |

A Bookseller Problem

Now let's look at a problem that shows metadata as well as data. Here is the problem domain:

> An Internet retail bookseller operates through legal entities in various countries. Any legal entity may sell books to anyone. People are required to register with the legal entity before they can purchase. For copyright and legal reasons not all books are sold in all countries, so the books that each legal entity can offer a customer depend on the customer's country of residence.
> Each legal entity sets its own prices in local currency according to the customer's country of residence. Price increases may be recorded ahead of the date that they become effective. Customers are awarded points when they buy, which may be traded in against the price of a purchase. The number of points awarded for a given book by a legal entity does not vary with the currency in which it is priced.

Here is the metadata that describes the structure of orders. The items in bold are entity types: we shall discuss exactly what that means later.

> Legal entity sells Book
> ... worth Points
> ... in Country
> ... from Date
> ... at Price
> Person lives in Country
> Person customer of Legal entity
> ... has earned Points
> ... orders Book
> ... on Date
> ... at Price Now the data itself. The items in bold italics are entities; again, we shall discuss what that means later. First we define the group of them that we are using; two legal entities, two books, two customers and two countries:

Amazon is a Legal entity

Bookpages is a Legal entity

Dr No is a Book

Michael Peters is a Person

Michael Peters lives in Britain

Mary Davis is a Person

Mary Davis lives in America

Britain is a Country

America is a Country

Spycatcher is a Book

Next comes the price list:

> Amazon sells Dr No
> ... worth 75 points
> ... in Britain
> ... 1-Jan.-98
> ... at £10
> ... in America
> ... from 1-Mar.-98
> ... at $16

-continued

```
              Amazon sells Spycatcher
                 . . . worth 50 points
                    . . . in Britain
                       . . . from 1-Jun.-98
                          . . . at £7
                    . . . in America
                       . . . from 1-Jun.-98
                          . . . at $12
              Bookpages sells Dr No
                 . . . worth 35 points
                    . . . in Britain
                       . . . from 1-Jan.-98
                          . . . at £8
                    . . . in America
                       . . . from 1-Jan.-98
                          . . . at $14
              Bookpages sells Spycatcher
                 . . . worth 35 points
                    . . . in America
                       . . . from 1-Jun.-98
                          . . . at $13
```

Now, for each of our two customers we record the number of points awarded to date, together with a single order:

```
              Michael Peters customer of Bookpages
                 . . . has earned 1,200 points
                 . . . orders Dr No
                    . . . on 10-Oct.-98
                       . . . at £10
              Mary Davis customer of Amazon
                 . . . has earned 750 points
                 . . . orders Spycatcher
                    . . . on 19-Oct.-98
                       . . . at $12
```

Figure 4A:
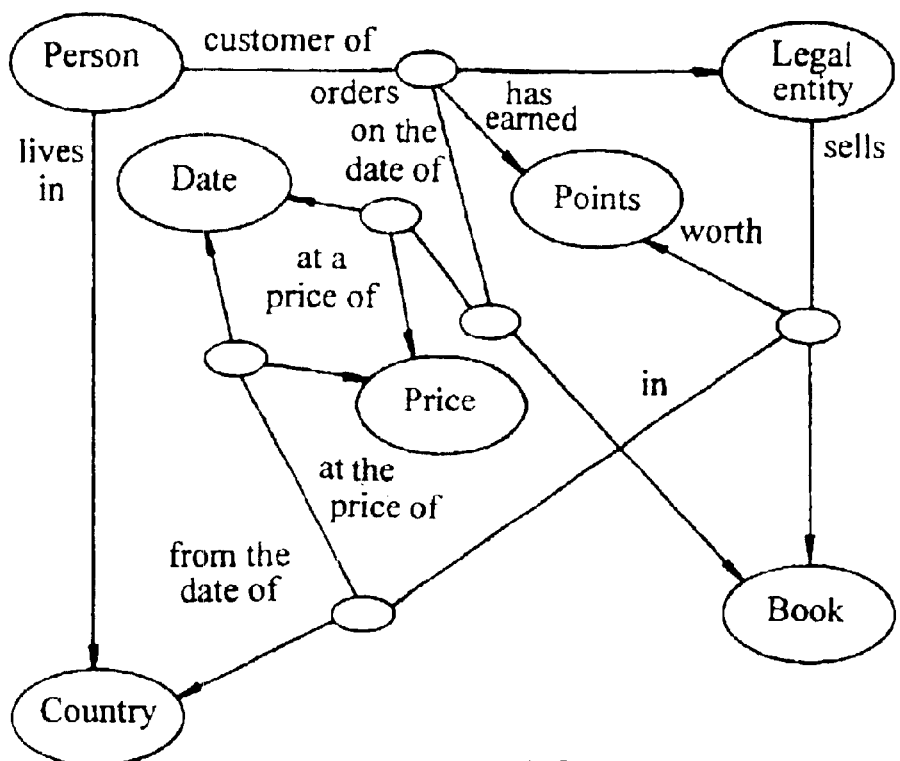
FIG. 4A presents a schematic for the associations of metadata.
Figure 4B:
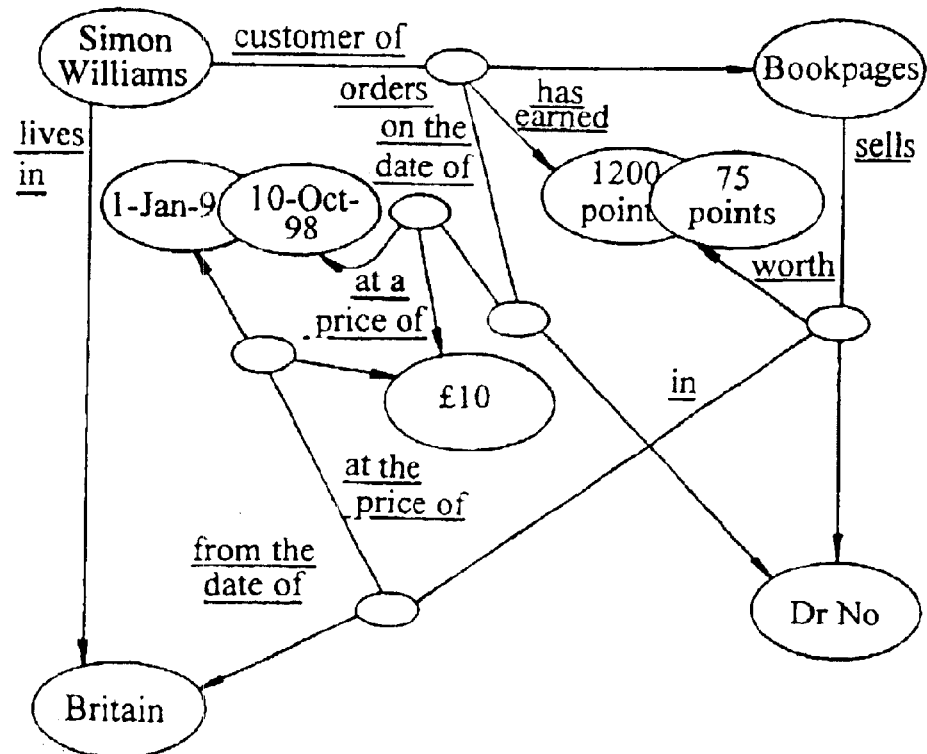
FIG. 4B shows the connection of this schematic to data.

FIG. 4A shows the metadata for the bookseller problem in diagrammatic form. The ovals are items; the lines are links. FIG. 4B presents part of the data for the bookseller problem in the same diagrammatic form.

Let's see the metadata for the bookseller problem in associative and relational forms side by side. First, the associative model metadata again:

```
              Legal entity sells Book
                 . . . worth Points
                    . . . in Country
                       . . . from Date
                          . . . at Price
              Person lives in Country
              Person customer of Legal entity
                 . . . has earned Points
                 . . . orders Book
                    . . . on Date
                       . . . at Price
```

Now, here is how SQL would express the same problem for the relational model:

```
CREATE TABLE Person
    ( Person_id,
      Person_name,
      Country_id REFERENCES Country,
      PRIMARY KEY ( Person_id ) )
CREATE TABLE Country
    ( Country_id,
      Country_name,
      PRIMARY KEY ( Country_id ) )
CREATE TABLE Book
    ( Book_id,
      Book_name,
      PRIMARY KEY ( Book_id ) )
CREATE TABLE Legal_entity
    ( Legal_entity_id,
      Legal_entity_name,
      PRIMARY KEY ( Legal_entity_id ) )
CREATE TABLE Books_sold
    ( Legal_entity_id REFERENCES Legal_entity,
      Book_id REFERENCES Book,
      Points,
      PRIMARY KEY (Legal_entity_id, Book_id ) )
CREATE TABLE Books_sold_by_country
    ( Legal_entity_id REFERENCES Legal_entity,
      Book_id REFERENCES Book,
      Country_id REFERENCES Country,
      PRIMARY KEY ( Legal_entity_id, Book_id, Country_id ),
      FOREIGN KEY ( Legal_entity_id, Book_id ) REFERENCES
   Books_sold)
CREATE TABLE Price_list
    ( Legal_entity_id REFERENCES Legal_entity,
      Book_id REFERENCES Book,
      Country_id REFERENCES Country,
      Effective_date,
      Price,
      PRIMARY KEY ( Legal_entity_id, Book_id, Country_id,
   Effective_date ),
      FOREIGN KEY ( Legal_entity_id, Book_id ) REFERENCES
   Books_sold,
      FOREIGN KEY ( Legal_entity_id, Book_id, Country_id )
   REFERENCES
          Books_sold_by_country )
CREATE TABLE Customer
    ( Legal_entity_id REFERENCES Legal_entity,
      Person_id REFERENCES Person,
      Points_earned,
      PRIMARY KEY ( Legal_entity_id, Person_id ) )
CREATE TABLE Order
    ( Order_id,
      Legal_entity_id REFERENCES Legal_entity,
      Person_id REFERENCES Person,
      Book_id REFERENCES Book,
      Order_date,
      Price,
      PRIMARY KEY ( Order_id )
      FOREIGN KEY ( Legal_entity_id, Person_id ) REFERENCES
          Customer )
```

So what the associative model says in 11 lines of metadata takes 51 lines of SQL. Here are the relations that record the same data as the associative model example above:

Person

| Person id | Person name | Country id |
|---|---|---|
| P123 | Simon Williams | GB |
| P234 | Mary David | USA |

Country

| Country id | Country name |
|---|---|
| GB | Britain |
| USA | America |

-continued

| Book | |
|---|---|
| Book id | Book name |
| B345 | Dr No |
| B456 | Spycatcher |

| Legal entity | |
|---|---|
| Legal entity id | Legal entity name |
| L01 | Amazon |
| L02 | Bookpages |

| Books sold | | |
|---|---|---|
| Legal entity id | Book id | Points |
| L01 | B345 | 75 |
| L01 | B456 | 50 |
| L02 | B345 | 35 |
| L02 | B456 | 35 |

| Books sold by country | | |
|---|---|---|
| Legal entity id | Book id | Country id |
| L01 | B345 | GB |
| L01 | B345 | USA |
| L01 | B456 | GB |
| L01 | B456 | USA |
| L02 | B345 | GB |
| L02 | B345 | USA |
| L02 | B456 | USA |

| Price list | | | | |
|---|---|---|---|---|
| Legal entity id | Book id | Country id | Effective date | Price |
| L01 | B345 | GB | 1-Jan.-98 | £10 |
| L01 | B345 | USA | 1-Mar.-98 | $16 |
| L01 | B456 | GB | 1-Jun.-98 | £7 |
| L01 | B456 | USA | 1-Jun.-98 | $12 |
| L02 | B345 | GB | 1-Jan.-98 | £8 |
| L02 | B345 | USA | 1-Jan.-98 | $14 |
| L02 | B456 | USA | 1-Apr.-98 | $13 |

| Customer | | |
|---|---|---|
| Legal entity id | Person id | Points earned |
| L01 | P234 | 750 |
| L02 | P123 | 1,200 |

| Order | | | | | |
|---|---|---|---|---|---|
| Order id | Legal entity id | Person id | Book id | Order date | Price |
| 02001 | L01 | P123 | B345 | 10-Oct.-98 | £10 |
| 02006 | L02 | P234 | B456 | 19-Oct.-98 | $12 |

A. Conceptual Layer

The transition from things in the real world about which we want to record information to bytes on a disk in a database uses a modelling system to take us through three layers of abstraction: a conceptual layer, a logical layer and a physical layer. Each layer is less abstract and more concrete than its predecessor.

The conceptual layer describes the conceptual building blocks that the modelling system uses to represent things in the real world, and sets out rules about how they may be used.

The logical layer describes the logical building blocks which the database uses to store and access data, and how the conceptual building blocks are mapped on to them.

The physical layer describes the physical building blocks which exist in the computer's memory and are stored and retrieved in its disk storage, and how the logical building blocks are in turn mapped onto the physical ones.

The conceptual and the logical layers together make up the data model; the logical and the physical layers together make up the database management system. The three layers of the associative model will now be described.

Entities and Associations

Database management systems record the existence and properties of things in the real world. Application development methodologies and tools have used various different words, such as "entity", "object" and "instance", to express the idea of an individual thing about which information is recorded. Each time a word is used, it acquires a new set of semantic overtones that are difficult to set aside: for example, it would be unthinkable now to use the word "object" in the context of a database management system without taking on board its object-oriented connotations. For that reason, those things whose existence and properties are recorded by a database are herein simply called "things".

The associative model divides things into two sorts: entities and associations.

Entities are things that have discrete, independent existence. An entity's existence does not depend on any other thing. Some types of things that would be represented by entities are people, cities, countries, books, vehicles, buildings, corporations and other legal entities.

Associations are things whose existence depends on one or more other things, such that if any of those things ceases to exist, then the thing itself ceases to exist or becomes meaningless. Some types of things that would be represented by associations are employees, customers, contracts, marriages, journeys, production runs, and corporate headquarters. For example:

An employee is an association between a person and a legal entity.

A customer and a contract are associations between two people, a person and a legal entity or two legal entities.

A marriage is an association between two people.

A journey is an association between whatever is travelling—a vehicle or a person—and a route. A route is itself an association between an origin and a destination.

A production run is typically an association between a product and a date/time, and a production facility.

A corporate headquarters is an association between a corporation and a building or a location.

An association may depend upon another association: for example, a sales order may depend on a customer, which is itself an association. Similarly each line of a sales order depends on the sales order itself.

By asserting that entities and associations are two fundamentally different types of real-world things, the associative model separates two ideas: on one hand, the idea of a thing in the real world that has discrete, independent existence, and on the other hand the idea of the various different ways in which such a thing interacts with other things. Each such interaction is a thing in its own right, about which we may want to record information.

A person is an entity, whilst a person's roles as a customer, an employee, a spouse, a salesperson, a shareholder, a team member and so on are associations.

An enterprise is an entity, whilst an enterprise's roles as a customer, a supplier, a contractual party, a tenant, and so on are associations.

A consumer good sch as a car or a television, is an entity, whilst its various roles as the end product of a manufacturing process, a production schedule line item, the subject of a warranty agreement, and so on are associations.

Figure 5:
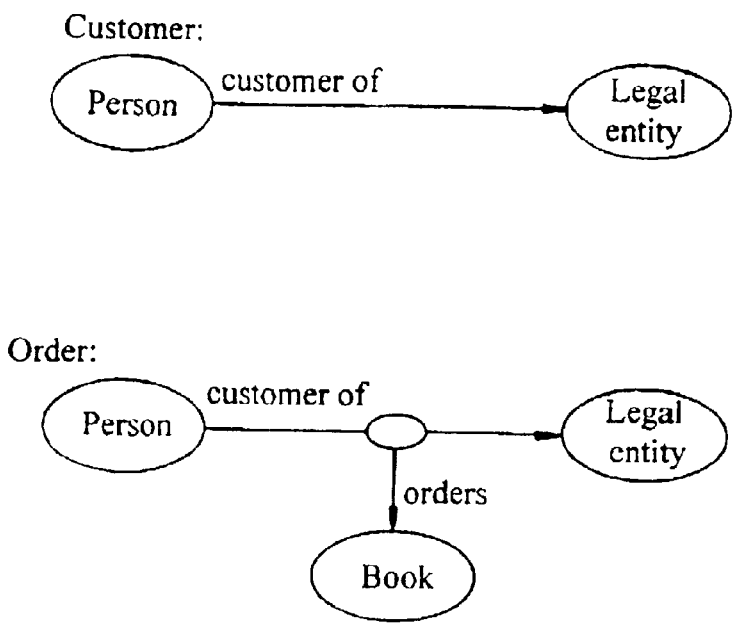
FIG. 5 depicts exemplary associations according to the present invention.

A real-world association is represented within an associative database as an association between two other things, each of which might itself be an entity or an association. So customers and orders are represented by the constructs depicted in FIG. 5.

To decide whether a thing is an entity or an association, ask yourself whether there is any other thing in the real world which, if it ceased to exist, would render the thing in question non-existent or meaningless. If so, the thing is an association; if not, it is an entity.

This test must always be applied in the present, not in the past or in the future. Obviously a person could not exist but for the two other people who were its parents, but this does not mean that people are associations. Nor is this type of dependence in any sense physical: one might say that a building depends on the ground that supports it, such that if the ground were removed the building would cease to exist. But the building would not cease to exist: it would simply be transformed to a different state—a heap of rubble—but would still exist in the sense that we are using in the context of the associative model. Similarly a person who has died, even a person whose mortal remains have long since ceased to exist, is still an entity.

The associative model distinguishes entities and association for a simple and fundamentally important reason: data models constructed by following this principle are closer to reality, and thus easier to comprehend, better able to respond to change, and better able to integrate readily with other data models. Such data models will serve users better and prove more cost-effective, in both the short term and, more importantly, over the long term.

The distinction between entities and associations is one that other data modelling systems ignore or regard as peripheral. Most other systems would model a customer as an independent entity or object, whilst in the associative model it is an association. Specifically, the relational model does not distinguish entities and associations, on the grounds that both entities and associations have, in Codd's words, immediate properties. This is certainly a good reason to treat them similarly in many respects, but it is not a sufficient reason to ignore the distinction: to do so is rather like saying that because women and men are both human beings, therefore we can ignore any differences between them.

Why Associations?

For those of us brought up with the relational model, thinking in terms of entities and associations instead of just tables is a departure. Moreover the concept of associations as representing things in the real world is not essential to the associative model: one can still use an associative database to good effect and take advantage of its key benefits even if one models everything as entities. So why does the associative model advocate the use of associations in this way? It does so because it is more true to life: in other words, it is a better model of information in the real world.

Most modelling systems represent a customer as an entity in its own right with independent existence (albeit with dependencies on other entities). However, in reality, "customer" is not an independent entity: it is a name we give to a role that one legal entity plays with respect to another. Suppose Company A is setting out for the first time to develop its operational applications, the first of which is sales order processing. When it models legal entities for the first time, in the context of sales order processing, they appear in the role of customers, so Company A models them as single, independent entities. A customer entity has attributes of name, address, telephone number, buying contact's name, credit limit and so on.

Having implemented sales order processing, Company A turns to its purchasing system. Now it needs to model legal entities for a second time, this time in the role of suppliers. It has already modelled them once, as customers, so can it reuse its customer entity? No, because each customer's attributes include both those related to its existence as a legal entity, and those related to its role as a customer, and the latter would be inappropriate in its role as a supplier. So legal entities that are suppliers must be modelled separately, as supplier entities. This involves repeating work already done in modelling the attributes that relate to a supplier's existence as a legal entity: name, address, telephone number and so on. When Company A wants to communicate with all of its customers and suppliers—perhaps following its change of address—two mailshot programs have to be developed and run, one for customers and one for suppliers.

Moreover, it is not unusual for one legal entity to operate in the roles of both customer and supplier with respect to another. Many opportunities are lost by modelling them separately. Suppose Company B is such a legal entity. When Company B changes its address, Company A has twice the work to do. Also Company A loses the opportunity readily to pool all of its information about Company B. Applications and users alike should be routinely aware of the big picture concerning Company B, such as for example when Company A owes Company B £5,000 in its role as supplier whilst at the same time is owed £10,000 by Company B in its role as customer. When Company B's two roles are modelled separately, it requires more work from programmers and users alike to ensure that Company A's interests are protected. A company for whom I built sales and purchase applications in 1980 estimated that the 5% of its business partners with whom it had both customer and supplier relationships consumed 50% of the time of its accounts department.

There is another aspect to this approach to modelling. Early in its life, when it was first developing its sales order processing system, Company A was a single legal entity, so the question of which legal entity owned a customer relationship did not arise: there was only one. Consequently it modelled its customers as individual entities with no capability to record that some legal entity other than Company A might own a customer relationship. As Company A grew, like most successful companies it soon established its first subsidiary company as a separate but affiliated legal entity. At this point its desire to retain a centralised account receivable function forced it to modify its system heavily to introduce this capability. The associative model would have prompted it to model customers as an association between two legal entities from the start.

Each of the approaches advocated here—separating the notion of a customer into its two aspects of a legal entity and its role as a customer, and modelling a customer as a relationship between two legal entities—can be implemented using the relational model via a modelling system that represents real-world associations as independent entities. But they are not natural features of the relational model, and both lead to a proliferation of tables that may be viewed as unnecessary complexity. Also there are no mechanisms within the relational model to guarantee the integrity of the essential associations that are inherent in this approach. Under the relational model, a sales order may survive the deletion of the customer who placed it, thus rendering it meaningless. By contrast, under the associative model, when a sales order is modelled as an association with a customer, deletion of the customer necessarily destroys its orders, and conversely an order cannot exist without a customer. This is because links whose sources or targets cease to exist also themselves cease to exist. Under the associative model, the designer's decision on whether to model something in the real world as an entity or an association is theirs and theirs alone. The associative model advocates and rewards the use of associations, but does not mandate it.

Attributes as Associations

The pieces of information that a database records about a thing are called its attributes. In the real world, we describe things by associating them with other things. When we say the sky is blue we are describing the sky by associating it with blue. The two things that are connected are the source and target respectively. The connecting verb is the nature of the attribute.

Natures are usually verbs, sometimes abbreviated to prepositions. In everyday speech, we often mix together the words that represent targets and natures: we say Simon has two legs instead of Simon has number of legs Two. Also we often omit the nature altogether when it can be safely inferred from the targets: the sky is blue meaning the sky is coloured blue.

There are two different ways to represent an attribute in a database management system, depending on whether or not the target of the attribute is represented as an entity within the database:

If the attribute's target is represented as an entity, then the attribute is represented as a link between the source and the target: Order 123 was placed by Customer 456.

If the attribute's target is not represented as an entity within the database, then the attribute is represented by a value that has no identity and exists solely for the purpose of expressing this single attribute: Customer 456 is called "Avis". The value is part of the source's representation in the database, and is local and private to it. Other attributes may target identical values, but the values are repeated every time, and no attempt is made to relate second and subsequent occurrences of the value in the database to the first. Such values are identical, but are not the same value. ("Equivalent but not the same" is an important distinction: Consider three variables A, B and C, where A=27; B=twenty-seven; C=the value expressed by A. If I change A, the value expressed by B doesn't change, but the value expressed by C does. A, B and C all refer to identical values, but only A and C refer to the same value.)

Using the first approach to record an address, each city would be represented as an entity in its own right, so that every city is represented once and once only in the database, and the unique representation is referenced by every address or any other piece of data that includes the city. Using this approach with the relational model, each city would be represented by a tuple in a City relation.

Using the second approach, the city would simply be part of the text of the address, so that each city is potentially many times, and no attempt is made to relate one representation of a city to any other.

The associative model uses only the first approach. All attributes are represented as links between things within the database, and the target of every attribute is another thing that is represented within the database in its own right. So in the associative model, attributes are represented as links between the entity or association whose attribute we are recording as the source, a verb to express the nature of the attribute, and an entity or association as the target. But we have already said that associations are links between two things, so this means in practice the attributes and associations are indistinguishable. So, in the associative model it is sufficient to say that things are described by means of their associations with other things, and attributes are no different from associations in general. This is good news, because at any time we may decide to describe an attribute by giving it attributes of its own. A significant component of many data models cannot simply vanish, so what has become of attributes, in the sense of non-foreign key values in the columns on a relation, in the associative model? The answer is that they are simply associations that are not themselves the source of any further associations. In our example, Legal entity sells Book and (Legal entity sells Book) worth Points are both associations: the latter might be termed an attribute because it has no associations of its own. Having said this, let me reiterate that the notion of an attribute as distinct from an association plays no part in the implementation of the associative model: things are described solely by means of their associations with other things.

Modelling attributes as associations affords us the chance to record information about attributes. In its simplest form, a credit control application might say <Customer> has credit limit Value. This may suffice for a time, but as our credit control grows more sophisticated, it may become useful to know when a customer's credit limit was increased or decreased to its current value. The associative model allows us to add attributes to our attribute, as in (<Customer> has credit limit Value) as of Date.

The Associative Model's Information Feature

The foregoing lets us assert the associative model's feature that all information must be cast explicitly in terms of associations, and in no other way.

Entity Types and Entities

There are two ways to describe a thing. We can list all of its attributes individually one by one: Michael Peters has two legs, two arms, one head, two eyes and so on. Or, more efficiently, we can say that a thing is a member of a group of things that has a set of attributes in common, and that by virtue of its membership of the group, it acquires its own values for each of those attributes. So if we say Michael Peters is a Human being, then it follows that he has two legs, two arms and so on.

In the associative model, collections of similar entities are represented by entity types. An entity's membership of an entity type is recorded by means of an entity type assertion, which is a link between the entity and the entity type, using the verb is a. Each entity is an instance of its entity type, and is said to instantiate the entity type. Each entity type has a number of association types. Each association type describes a particular association that each instance of the entity type may have. Thus the association type Person has date of birth Date means that every person will have a date of birth attribute. Association types are links that have the entity type itself as their source, and an entity type or association type as the target, with a verb that indicates the nature of the association type.

Identity

Entities are unique, individual things, tangible or intangible. Entities have identity: that is, they are capable of being identified unequivocally and distinguished from other, similar entities within the problem domain.

Identity is a subtle concept. In everyday speech we often refer to things by their types, knowing that our audience can fill in the blanks from their understanding of the context: "I'm going to the supermarket"; "Pass me the pen"; "Where are the kids?"; "Get into the car" are all examples of referring to things by their type. In the real world, identifying something unequivocally is not always as easy as it sounds. To express "I'm going to the supermarket" using identities instead of types I would need to say something like: "I, Simon Guy Williams, citizen of Great Britain with National Insurance number YJ 47 89 76 D, am going to the Safeway supermarket in Tavistock, Devon, England".

In the world of application development we routinely deal with abstractions and types, so we need to be particularly careful filling in the blanks. When we say "a person has a date of birth" we usually mean "every person has a date of birth". Here we are using the word person to refer to a type of entity, and thus to all entities of that type. When we say "I spoke to a person", we mean "I spoke to an individual person". Here we are using the word person to refer to an entity.

"Capable of being identified" doesn't mean that an entity is necessarily already identified unequivocally, but simply that if we decide that we need to identify it we could do so. In other words, having identity is not the same thing as having an identifier. An identifier may be a key, a surrogate key, or a surrogate that uniquely identifies an entity within the problem domain.

A key is some combination of one or more of an entity's existing properties that identifies it uniquely.

A surrogate key is a new property created solely for the purpose of identifying an entity within the problem domain of the database, and its use for any other purpose is prohibited or strongly discouraged. A surrogate key is a key, and behaves in all respects in the same way as a key, being visible to the user, but its values are typically drawn from one simple domain.

A surrogate, like a surrogate key, is created solely for the purpose of identifying an entity. Additionally it is assigned by the system and is never visible to the user under any normal circumstances.

An entity may have any number of identifiers, including zero. Every entity has identity, but not all entities have an identifier—every grain of sand is an entity, but few of them have identifiers. Something that purports to have an identifier may not necessarily be unique: any implementation of the relational model that fails to expressly prohibit duplicate tuples lays itself open to this state of affairs. A thing that is not unique and does not have identity is not an entity but a type. The name "Michael Peters" on its own is not an identifier except within a very limited problem domain: there are probably several hundred or more Michael Peters is the UK alone; hence Michael Peters is a type.

In the associative model, every entity is assigned its own identifier in the form of a surrogate as soon as it is created. To reiterate, a surrogate exists solely for the purpose of identifying an entity to the database management system. It is assigned by the database management system, and is never seen by the user. Given that there is an entity for every scalar and every string, and that surrogates are never re-used, there needs to be a large supply of them in each database. There is no practical limit to the number available: in the current implementation there are $2^{48}$ (more than 281 trillion) available in each chapter for each type of item, and the number of chapters in a database is limited only by the number of possible paths or URLs in the world.

Names

Surrogates are invisible, so database users visually identify entities by name and type. Every entity has a name, which is a string of unlimited length. Because the system identifies entities by surrogate key, it is indifferent to duplicate names, so users are able to specify how they would like duplicate names to be treated: usually duplicate names within a single database are not a good idea and users will ask the system to preven his happening by prohibiting the creation of duplicate names.

However, the associative model allows separate databases to be freely merged or viewed as one, and in this situation duplicate names are almost inevitable, and moreover not inappropriate. When duplicates occur, the user will inspect each entity and its immediate associations to decide which real-world thing it represents and, depending on the circumstances, either choose the appropriate one, or alter the name of one to remove the ambiguity.

Association Types and Associations

Collections of associations that have associations in common are represented by association types, and an association is an instance of its association type. Association types have the following properties:

Name: appears as the verb in associations that instantiate this association type.

Source type: the source of associations which instantiate this association type must be of this type.

Target type: the target of associations which instantiate this association type must be of this type.

Cardinality: determines how many instances of this association type may share the same source.

Inverse cardinality: determines how many instances of this association type may share the same target.

Sequenced or sorted: determines whether multiple instances of this association type that share the same source are presented in the natural order of their targets ("sorted"), or in an order determined by the user ("sequenced").

Default target:

An association type also determines which associations, if any, its instances may have, by means of its own association types. Again, paralleling entity types, these are links that have the association type itself their source, and an entity or association type as the target, with a verb that indicates the nature of the association. This gives us:

---

Person customer of Legal entity
   . . . placed an order on Date
     . . . for Book
        . . . in quantity Quantity

---

Inverse Associations

In the real world, when A has a relationship with B, B has some type of relationship with A. Sometimes this inverse relationship is significant; sometimes it is trivial. If Fred is married to Mary, it is probably significant for Mary that she is married to Fred; on the other hand, that the earth orbits the sun is significant for the earth, but that the sun is orbited by the earth is of very little significance for the sun.

In the associative model, every association type has an inverse, either explicit or inferred, which expresses the opposite voice (active or passive) to the verb itself. Where it will add more meaning, a verb to be used for instances of an association type's inverse associations may also be specified as part of the association type definition:

---

Person customer of Legal entity
   . . . inverse verb suppler of

---

When the inverse is not specified, is inferred according to the following rules:

If the verb begins with "has", the "has" will be removed and the suffix "of" will be added: "has customer" becomes "customer of".

If the verb ends with "of", the "of" will be removed and the prefix "has" will be added: "customer of" becomes "has customer".

If the verb neither begins with "has" nor ends with "of", the suffix "of" will be added: "order date" becomes "order date of".

If the verb both begins with "has" and ends with "of", the prefix "inverse of" will be added: "has order date of" becomes "inverse of has order date of".

Although inverse associations do not physically exist as links, they are always included in queries unless the metadata indicates as part of the association type definition that they are not to be.

Cardinality

We mentioned an association type's cardinality and inverse cardinality above. The cardinality of an association type is one of four values: "Zero or one"; "One"; "One or more"; "Any number". Any association type for which cardinality is not explicitly specified is assumed to have cardinality One. The effect of the various cardinalities on the association type Person orders Book is as follows:

Zero or one: a person may order no books or one book.
One: a person orders one book and one only.
One or more: a person must order at least one book.
Any number: a person may order any number of books from zero upwards.

An association type may also have an inverse cardinality, which in this example would say in how people may order a book. Cardinality itself says nothing about its inverse: the fact that a person must order at least one book says nothing about how many people may order a single book. If the inverse cardinality is to be checked, it is recorded as part of the association type's definition.

Zero or one: a book may be ordered by no more than one person
One: a book must be ordered by one person and one only.
One or more: a book must be ordered by at least one person.
Any number: a book may be ordered by any number of people from zero upwards Inverse cardinalities of "one" and "one or more" are not as useful as the other two, because, given that we have chosen to assert that the association type points actively from person to book, it is reasonable to suppose that books are passive in the association, and thus do not know or care how many people order them. Moreover, if a type is the target of an association type whose inverse cardinality is "one" or "one or more", we reach deadlock when we try to create a new instance: it can't exist unless something points to it, and nothing can point to it until it exists.

Default Targets

Most association types have different targets each time they are instantiated—Person born on Date is a good example—but sometimes every instance of an association type has the same target most or all of the time. In this case, a default target may be recorded for the association type as part of the metadata. When an association that instantiates an association type with a default is about to be created, if the association's target is the same as the default, the association is not created, but is inferred with the default target in all queries. For example:

(Human being has number of legs Zero, one or two) default Two implies that every instance of entity type human being has two legs.

Inferred Associations

As we have seen, there are two cases where the existence of associations that do not physically exist is inferred by the system: inverse associations and associations whose target is a default. Several points arise:

During queries and information retrieval within the system, inferred associations behave like real ones in every respect.

When data is exported from a database via ODBC, JDBC or other middleware component, inverse associations are not included.

The inverse association of an inferred default association is also inferred.

Instance Association Types

The associative model permits an association type that is specific to a single entity or association. This is modelled as an association type whose source is an instance, not a type. Associations that instantiate this association type are created and maintained in the normal way: the single additional rule is the source of such associations must be the entity or association that is the source of the association type.

Subtypes and Supertypes

A entity or association type may be the subtype or supertype of another type. An instance of a subtype has associations that instantiate the association types of its type, and also those of its type's supertypes and their supertypes. So:

Tangible object weight Kilos
Car subtype of Tangible object
Car number of wheels Four
Car number of seats Between one and five
S234AAF is a Car
. . . leads us to:
S234AAF weight 1,759 kilos
S234AAF number of wheels Four
S234AAF number of seats Five A type may have multiple supertypes, so we could add to the above:

Vehicle maximum speed Miles per hour
Car subtype of Vehicle
S234AAF maximum speed 150 mph Some entity and association types are abstract: that is, they are not intended to be instantiated, and exist solely to add to the set of association types that instances of their sub-types may instantiate. For example, it might be appropriate to decide that Tangible object was an abstract entity type as long as we are sure that our application will never need to deal with entities whose sole properties are those of a tangible object.

When the target of an association type is a supertype, members of the supertype itself and its subtypes are candidates as targets of the associations that instantiate the association type. Similarly, when we ask an associative database to show us all instances of a type that has sub-types, we would expect to see all instances of the type itself (if it has any) together with all instances of each of its sub-types. Although we think most readily in terms of entity subtypes and supertypes, the sub-and supertype capabilities apply equally to both entity types and association types. Here is an example of as association subtype and supertype:

(Animal has number of limbs Integer) supertype of (Human being has number of arms Small integer)

Entity supertypes and subtypes need only be semantically sensible, but for association supertypes and subtypes there are some formal rules to be observed. For one association type to be a subtype of another:

The subtype's source must be the same as or a subtype of the supertype's source

The subtype's target must be the same as or a subtype of the supertype's target

So our example above requires that:
Human being is a subtype of Animal
Small integer is a subtype of Integer Sub- and super-typing has two main uses. First is the classic "specialisation/generalisation", or inheritance, mechanism, that permits the definition of a class to re-use the definition of more abstract class. This is best exemplified by the taxonomy of living and extinct organisms. For example, we re-use the definition of vertebrate to define *Homo sapiens*.

Secondly, abstract supertypes are often a useful way to group together otherwise heterogeneous things that form a group for some special purpose. For example, contractual parties may be corporate entities or individuals:

Contract party Contractual party
Person subtype of Contractual party
Company subtype of Contractual party may be a more elegant way to implement:

Contract party Person
Contract party Company

Subsets and Supersets

As well as entity subtypes and supertypes, the associative model makes use of inferred subsets. A subset is a type that behaves as a subtype, except that it may not be the target of an entity type assertion: in other words, its membership is inferred, not explicitly declared. For example: Good customer subset of Customer. Having said that Good customer is a subset, we would no longer be allowed to assert that XYZ is a Good customer. As a corollary, if an entity type has explicitly declared members, it cannot be a subset. A subset is populated with the result set of a query:

Good customer subset of Customer
. . . populated by Good customers query

The difference between subsets and subtypes is that membership of subsets is inferred, and therefore transient, whilst membership of subtypes is asserted and permanent. A subset is automatically a subtype of its superset. A subset may have subsets, but a subset may not have more than one superset.

Subsets are a useful mechanism to keep track of the various states that an entity or association may pass through. For example, a credit control system may track customers as new, established, premium, watch or stop according to their membership of inferred subsets that are based on queries run over their historic credit and buying patterns. Customers will automatically move into and out of subsets as their history develops.

Subsets are also useful as a validation mechanism. If our sales order processing system only accepts orders for Items in stock, we might define a subset of the entity type Item called Item in stock. We may then use Item in stock as the target of an order association: <Order> placed for Item in stock. Only items that are members of the Item in stock subset are then eligible to be entered on an order.

Scalars, Strings and References

As well as entities and associations in the sense that we have been discussing them, there are three other types of thing that may be stored: scalar values, strings and references. Scalar values (or scalars for short) express magnitude, such as numbers, quantities, monetary values, amounts, prices, ratios, dates, time intervals and so on. Strings are strings of characters, such as names, descriptions, codes and short, unstructured pieces of text. References are pointers to things that live outside the database but are referenced from within it. These include multimedia files, web site URLs, email addresses and so on. Together, these three types of thing represent what the relational model calls "values". They are all atomic from the database's point of view.

In the associative model, scalars, strings and references are treated as entities. Thus each individual scalar, string or reference is stored once and once only, and there never needs to be more than one occurrence of "1", or "Jan. 17, 1998", or "$100", or "15%", or "London" in a database. Notice that I said "there never needs to be", not "there is never". In practice, because the associative model allows separate databases to be freely merged or viewed as one unified database, often there will be more than one occurrence of a particular scalar, string or reference in a database. However, because they have no properties other than their name and type, the database management software ensures that there are no adverse consequences of representing a scalar, string or reference more than once in a database.

Scalars, strings and references may not be the source of any association types (because they are atomic from the database's perspective) and are associated with a datatype. Datatypes in the associative model are "soft"; that is, they comprise an open-ended set which may be added to by vendors and users alike. The implementation of a datatype must deal with the following:

Transformation of values from a format suitable for physical storage to a visual representation (including, in the case of references, appropriate rendering methods).

Parsing and transformation of values from a visual representation as a series of key-strokes to a format suitable for physical storage.

Precedence rules for sorting values into their "natural" sequence.

Implementation of the basic arithmetic and comparison operators (add, subtract, multiply, divide, less than, greater than, equal, not equal) between two instances of itself, and between one instance of itself and an instance of any other datatype.

In our Java implementation, each datatype is represented by a Java class within the package that comprises the database itself.

B. Logical Layer

Now we shall look more closely at the logical building blocks of the associative model: items, links, chapters and databases. First, recall that:

Under the associative model, a database comprises two data structures:

A set of items, each of which comprises, inter alia, a unique identifier, a name and a type.

A set of links, each of which comprises, amongst other things, a unique identifier, together with the unique identifiers of three other things, that represent the source, verb and target of a fact that is recorded about the source in the database. Each of the three things identified by the source, verb and target may each be either a link or an item.

The third type of building block is the container for items and links, which is called a chapter. A chapter contains a subset of the items and a subset of the links in a database, so each database comprises one or more chapters. Each chapter also contains a list of the chapters that contain the items and links whose identifiers occur as the source, verb or predicate of one or more of the chapter's own links. Such chapters are identified within a chapter by an identifier local to the chapter.

Items

The properties of an item are as follows:

Identifier

An item's identifier identifies it uniquely within the scope of its chapter and its type. The identifier is a surrogate, that is automatically assigned by the system to each new item as it is created and subsequently never changed. It exists solely to allow the system to identify and distinguish items, and is never seen by any developer or end-user. Identifiers of items that are removed from the database are never re-used.

The number of unique identifiers required by an associative database is of the same order as the number of cells (one column of a tuple) in a relational database. (The number is higher in that identifiers are never re-used, lower in that scalar values are represented as entities and thus occur once only, and lower in that no extra columns are required for foreign keys.) As a reality check, consider the hypothetical relational database of about 500 relations whose size is analysed in the following table. The columns mean that there are 8 relations of 10 million tuples with an average of 20 columns each, 16 relations of one million tuples with an average 20 columns each, and so on. As the table shows, the number of cells in such a database is about 2 billion.

| Number of relations | Number of tuples per relation | Average number of columns | Total number of columns |
|---|---|---|---|
| 8 | 10,000,000 | 20 | 1,600,000,000 |
| 16 | 1,000,000 | 20 | 320,000,000 |
| 32 | 100,000 | 20 | 64,000,000 |
| 64 | 10,000 | 20 | 12,800,000 |
| 128 | 1,000 | 20 | 2,560,000 |
| 256 | 100 | 20 | 512,000 |
| 504 | | | 1,999,872,000 |

An associative database with an identifier space of $2^{48}$ (about $2.8 \times 10^{14}$) would have sufficient identifiers to contain a snapshot of this hypothetical database 140,000 times over. A relational database of 500 tables with 8 tables of 10 million rows is in the top quartile of databases in use today. Nevertheless, in an implementation of the associative model the identifier space should always be as large as is practicably possible, and not less than $2^{48}$.

Name

An item's name is the piece of information by which the user visually identifies the item within its type. The name is not an attribute of the item in the usual sense. It is not part of the data that we store about an entity, but rather it is data that we use to help us to store data: in other words, a handle for the stored data. An item's name bears the same relationship to the data that we store about the item as the name of a file containing a Word document bears to the content of the document itself.

This also makes sense in the context of applications. We frequently use names for the entities with which we work that are not needed as part of the entities' stored data. Take IBM's customer centre on the south bank of the River Thames in London. Universally referred to as "IBM South Bank", its legal entity name is "IBM United Kingdom Ltd", and its postal address is "76/78 Upper Ground, London SE19PZ". A name is a character string of any reasonable length (in practice, 256 characters is probably sufficient). Any and every character that has an external representation is valid within a name, in any combination. Names may begin with one or more spaces. Names of all types of items except scalar values are purely descriptive. An item's name is not part of the data that the database records about an item and is not subject to the same rules and mechanisms. The item name should not be used or relied on as part of an entity's data. The appropriate way to represent the name of the entity Michael Peters would be:

Michael Peters forename Michael
Michael Peters second name John
Michael Peters family name Peters
. . . and if the name of the item "Michael Peters" were changed to "Mary Peters", until updated the database would continue to say:
Mary Peters forename Michael
Mary Peters second name John
Mary Peters family name Peters This is also relevant to enterprises, the name of whose entity would typically be that by which the enterprise is commonly known. So we would have, for example:
IBM legal entity name IBM United Kingdom Ltd Generally, an item's name is unique within its type and its database. However, there is no absolute requirement for names to be unique, and duplicate names within a type are handled by the database in the normal course of events. With one exception, the character string of an item's name is never altered. The general case is that, when the user needs to change the name of an item, and provided they are authorised to do so, the system effects the change as follows:

1. A new, archived item of the same type and name as the subject item is created.
2. A new, archived link is created between the subject item and the new item using the verb "name changed from".
3. The name of the subject item is changed to the new value entered by the user.

The sole exception is that the character string of an item's name may be altered by the user who created the item within the scope of the transaction that creates the item. (Transactions and their scope will be discussed later.) This is to avoid the creation of spurious items through mis-typing. The names of scalar values are their values. Such names have an internal and an external representation. The internal representation is what is stored on disk and in memory, and is in an implementation-specific format; the external representation is what is seen—that is, which data is displayed or printed. The representation of a scalar value is converted from internal to external and vice versa "at the glass"; i.e., just before being displayed or printed. This is similar to the way in which spreadsheets store and present values.

Item Type

Items represent the following types of things:
Entity type ("E-type"): An entity type is an abstraction that represents a collection of real-world entities which have properties in common. Entity types have features in common with classes, domains and relations.
  Entity types may be real or abstract. Abstract entity types may not be instantiated by entities, but exist as templates from which more concrete entity types may inherit properties.
Association type ("A-type"): An association type is an abstraction that represents a collection of similar associations between things in the real world. Association types have features in common with classes and relations.
  Association types may be real or abstract. Abstract association types may not be instantiated by associations, but exist as templates from which more concrete association types may inherit properties.
  Association types are items whose properties are associated with it by links. The association type item's name appears as the verb in associations that instantiate it. There are three categories of association type:
Regular association types are templates for associations that may be instantiated (as opposed to inferred) for each instance of the association type's source. The source and target of a regular association type are types.

Irregular association types are templates for associations that may be instantiated only on the instance that is the source of the irregular association type itself. The source of an irregular association type is an instance and its target is a type.

Type association types are templates for associations that are inferred (not instantiated) for each instance of the association type's source. The source of a type association type is a type and its target is an instance.

When the distinction between the three sorts of association type is important the full name is used. When the term association type is used without qualification, the distinction is immaterial.

Entity: An entity represents a discrete, independent thing in the real world. whose existence and properties are recorded in a database.

Verb: A verb expresses the nature of a link. There are two sorts of verb:

System verbs, whose meaning has particular significance to the system; and

User verbs, that occur as the inverse verbs of association types and associations, whose meaning is purely expressive and has no significance to the system.

Query: A query is a prescription to selectively retrieve and operate on information from the database.

Transaction: A transaction is a single database transaction that has the properties of atomicity, consistency, isolation and durability.

Aspect: An aspect is a view of the database including certain types and ranges of entities and associations and excluding others.

Literal: A literal is a character string expressing a rule about meta-data that is significant only to the database management system itself.

Links

The properties of a link are as follows:

Identifier

A link's identifier identifies it uniquely within the scope of its chapter and its type. The identifier is a surrogate, that is automatically assigned by the system to each new link as it is created and subsequently never changed. It exists solely to allow the system to identify and distinguish links, and is never seen by any developer or end-user. Identifiers of links that are removed from the database are never re-used.

The properties of the link identifier are the same as those of the item identifier except that they are assigned from a different range.

Source, Verb and Target

The source, verb and target of a link are each a reference to an item or a link. All such references comprise:

Chapter identifier: If the referenced item or link is not contained within the same chapter as this link (the "home chapter"), the chapter identifier is a reference to an entry in the home chapter's chapter list. This list in turn contains the path, URL or other address where the referenced chapter may be found. If the referenced item or link is contained within the home chapter, the chapter identifier is null.

Item or link identifier of the item or link referenced.

Certain types of link have no target. In this case, both the chapter identifier and the item or link identifier are null.

Originating Transaction

Each link carries a reference (chapter identifier and item identifier) to the transaction that created it. Transactions are represented within the database as items. There are two possible cases:

If the referenced transaction exists as an item within the database, then the link has been created by a completed transaction and the data that it represents is part of the database.

If the referenced transaction does not exist as an item within the database, the link has been created by a transaction that is still in progress or has aborted, and the data that it represents is not part of the record. Such links are always ignored.

Link Types

The type of a link is not recorded explicitly on the link: it can invariably be determined from its verb. Links represent the following sorts of things:

Association: An association is a link that represents an association between two things in the real world. Each association instantiates an association type. Its source is an entity or an association of the same type as the source of the instantiated association type; and its target is an entity or association of the type specified as the target of the instantiated association. There are three categories of association type:

Regular associations instantiate regular association types: that is, those whose source is a type.

Irregular associations instantiate irregular association types: that is those whose source is an instance. Its source is the same as that of the association type.

Type associations instantiate type association types: that is, those regular association types whose target is an instance. Type associations are not persistent: their existence is inferred for each instance of the source type.

When the distinction between the three sorts of association is important the full name is used. When the term association is used without qualification, the distinction is immaterial.

General type properties: Association types and entity types have the following properties in common, which are recorded by links of which the type itself is the source.

Supertype assertion: A supertype assertion records that the source entity type or association type has a supertype, which is the target entity or association type. The verb is the system verb "has supertype"; and the target is a type of the same sort—entity or association—as the target.

If the source and target types concerned are association types, it is a requirement that (a) the source type of the source association type is identical to or a subtype of the source type of the target association type, and that (b) the target type of the source association type is identical to or a subtype of the target type of the target association type.

Subset assertion: A subset assertion records that the source entity type or association type has a subset which is the target entity or association type. The verb is the system verb "has subset"; and the target is a type of the same sort—entity or association—as the target.

A type may have any number of subsets, including zero. A type may not have more than one supersets. A subset may have subsets of its own.

Subset query link: A subset query link determines the query that is used to test for membership of a subset. Its source is the subset assertion; the verb is the system verb "membership query"; and its target is a query. The type of the query result must be the same as or a superset of the type of the subset.

Abstraction flag: An abstraction flag link determines whether the type is abstract, which means that it may not be instantiated. The verb is the system verb "abstract"; and its target is one of the literals "Yes" or "No".

Association type properties: Association types are represented by items. They have properties not shared by entity types, which are recorded by the following types of link. In each case the association type is the source of the link.

Source type or instance: The source type or instance of an association type is associated with it by means of a link whose verb is the system verb "source"; and whose target is a type (for a regular association type) or an instance (for an irregular association type).

Target type or instance: The target type or instance of an association type is associated with it by means of a link whose verb is the system verb "target"; and whose target is a type (for a regular association type) or an instance (for a type association type).

Cardinality: The cardinality of an association type is represented by a literal, and is associated with the association type via a link whose verb is the system verb "cardinality"; and whose target is one of the literals "one", "zero or one", "one or more" or "any number".

Inverse cardinality: The inverse cardinality of an association type is represented by a literal, and is associated with the association type via a link whose verb is the system verb "inverse cardinality"; and whose target is one of the literals "one", "zero or one", "one or more" or "any number".

Inverse verb: The inverse verb of an association type is represented by a literal, and is associated with the association type via a link whose verb is the system verb "inverse verb"; and whose target is a user verb.

Dependency: A dependency link asserts that the existence of a particular association is either prohibited by or required by the existence of another association with the same source. The assertion is framed in terms of the association types that would be instantiated by the two associations. The verb is one of the system verbs "prohibited by" or "required by", and the target is an association type. Both source and target association types must have the same source.

Entity properties: Entities are represented by items. They have the properties which are recorded by the following types of link. In each case the association type is the source of the link.

Type assertion: A type assertion records that a particular entity instantiates a particular entity type. The source is an entity; the verb is the system verb "is a"; and the target is an entity type. An entity must have one and only one type assertion.

Query properties Queries are represented by items. Their properties are implementation specific.

Utility links: The following types of link may be found in conjunction with a variety of other types of link.

Equivalence assertion: An equivalence assertion records the fact that something is represented twice in the database. The source may be an entity, an entity type, an association, an association type or a user verb; the verb is the system verb "equivalent to"; and the target is an item or a link of the same sort as the source.

When data is displayed or queried, all references to the source are replaced by references to the target: in other words, the target appears as the source, verb or target of links where it appears as such in its own right, and links where the equivalence link is referenced as the source, verb or target respectively. An item or link that is the source of an equivalence is not normally displayed or seen by a query. A special mode for display or query is used to reveal such items and links.

Stop link: A stop link records the fact that the source is logically deleted. The source may be a link or an item; the verb is the system verb "is deleted"; the link has no target. When data is displayed or queried, the source and the stop link itself are ignored.

Sequence links: Sequence links determine the sequence in which a related group of links is displayed. There are two sorts of sequence link:

The first type begins each sequence. Its source is the first item or link in the sequence, or the parent of the sequence of items or links; the verb is the system verb "starts with"; and the target is the next item or link in the sequence.

The second type records each subsequent step in the sequence. Its source is the previous sequence link; the verb is the system verb "followed by"; and the target is the next item or link in the sequence. Sequence inks are mainly used to sequence the association types that form the predicates of a particular entity type or association type.

Chapters

A database is stored in any number of files called chapters, each containing a subset of the items and links in the database. Every chapter also includes its own list of the chapters that contain the items and links whose identifiers occur as the source, verb or target of one or more of the chapter's own links. These foreign chapters are identified within a chapter by an identifier local to the chapter, and the list includes the path name or URL that allows the chapters to be located across a network or via the Internet.

Returning to the simple example which we introduced in Chapter 6, suppose now that the items and links are stored in two chapters: Chapter A, which is stored in \\SRV1\DIR\FILE__A.CHP, and Chapter B, which is stored in \\SRV2\DIR\FILE__B.CHP. The identifiers that form the source, verb and target of each link now also include a local identifier for the chapter where the item or link is located.

In Chapter A we have:

| Items | |
| --- | --- |
| Identifier | Name |
| 787 | Flight BA1234 |
| 332 | 12-Aug.-99 |
| 132 | arrived at |
| 019 | at |

| Links | | | |
| --- | --- | --- | --- |
| Identifier | Source | Verb | Target |
| 784 | 0/787 | 0/132 | 1/008 |
| 053 | 0/784 | 1/767 | 0/332 |

| Chapters | | |
| --- | --- | --- |
| Local identifier | Chapter name | Location |
| 0 | Chapter A | |
| 1 | Chapter B | \\SRV2\DIR\FILE2.CHP |

In Chapter B:

| Items | |
| --- | --- |
| Identifier | Name |
| 008 | London Heathrow |
| 488 | 10:25 am |
| 767 | on |

-continued

| | | Links | |
|---|---|---|---|
| Identifier | Source | Verb | Target |
| 664 | 1/053 Chapters | 1/019 | 0/488 |

| Local identifier | Chapter name | Location |
|---|---|---|
| 0 | Chapter B | |
| 1 | Chapter A | \\SRV2\DIR\FILE1.CHP |

A database may comprise any number of chapters, and each chapter may be located anywhere on a network or on the Internet, provided only that it can access and be accessed by the other chapters.

The chapters in a database form a network of peers. From the standpoint of the database management system, individual chapters in a database have no special significance, although they may do so from the users' point of view. The three types of data contained in chapters are metadata, data and transactions.

Updates

Under the relational model, transactions update databases by creating, deleting and changing tuples in relations. (Terminology varies: I use the term "change" for the act of reading a piece of data, changing one or more of its values and rewriting it, and the word "update" to mean any alteration of a database's state, including create, delete and change.) By contrast, under the associative model, in the normal course of events data in a database is never physically deleted or changed. The process in the relational model whereby values in an existing tuple are physically altered to different values has no equivalent in the associative model. Instead, all changes in an associative database are effected by logically deleting the appropriate links and adding a new ones. A link is logically deleted by the addition of another link, called a stop link, which has the deleted link as its source. Thus, data is created, deleted and changed in an associative database by a single mechanism: the addition of new links. For example, in the bookseller problem, we had:

Amazon sells Dr No
 . . . worth 75 points

If Amazon now decides that Dr No is worth 100 points, the link with 75 points as its target is logically deleted by the addition of a new link, and a new link with 100 points as its target is added.

Amazon sells Dr No
 . . . worth 75 points
     . . . deleted by Transaction 97756392
 . . . worth 100 points The workings of this process are not visible to the user or to application programs, to whom the create, change and delete functions appear to operate as usual. Deleted links and stop links are not normally visible and are not retrieved by queries.

The Time Dimension

Shared databases typically comprise two parts: the database itself, which is a snapshot at one instant in time, and the log, or journal, which is a record of all transactions that have changed the state of the database. Specifically, the log contains the "before" and "after" images of changed tuples, and images of new and deleted tuples, together with information about when, how and by whom each change was made. In a sense, one might say that the log is the true record and the database is merely a snapshot of the record as at some point in time.

This representation of data in snapshot form is less than ideal from an operational standpoint. For example, when an enterprise changes its mailing address or telephone number, it will typically notify everyone with whom it deals several weeks ahead of the time at which the change becomes effective. The relational model is not equipped to easily accept transactions ahead of their effective time and apply them when the effective time is reached. Certainly the relational model can be used to build applications that behave in this way, but such behaviour is not a natural feature of the model. To incorporate it throughout an application would add a substantial overhead of effort and complexity to the development process, and it is not common practice to do so. Typically users devise clerical systems to ensure that transactions are applied at the point in time at which they are effective.

Nor is the relational model readily equipped to be able to allow users readily to view the state of the database, or of a particular object in it, as at an arbitrary point in time, past present or future. So it is not evident to users, for example, that a customer has recently changed its address, or what its previous address was. There are many operational circumstances where this type of historical information, were it readily available, would be useful. Again, the relational model can be used to build applications that behave in this way, but again it is at the cost of extra effort and complexity, and such refinement is not the norm.

As customer service standards and expectations rise, the lack of these two important capabilities is becoming more keenly felt.

The associative model does not employ this separation of a current snapshot and a historical journal.[1] Because data is not changed or physically deleted, it is possible at any time to view the state of the database, or anything in it, as it was, is or will be at a specified moment in time, past, present or future.

[1]Notwithstanding this, clearly a separate journal is required to ensure that the database may be recovered following a media failure Transactions A database reflects the state of some part of the real world. When something in the real world changes, the database must change too to ensure that it still accurately reflects the real world. The thing that causes the database to change in response to a change in the real world is called a transaction. Transactions vary in length. A short transaction might correct a mis-spelling in an address, which would require an alteration to a single property of a single thing. A transaction of medium length might add a sales order for twenty different product lines to the database, which would require the addition of dozens of new things to the database, each with its own properties. A long transaction might add an enterprise's complete line-item budget for a new fiscal year, which would require the addition to the database of hundreds or thousands of new things, each with its own properties, and might require the addition of some entirely new types of things. So a single transaction may initiate anywhere between one and several thousand updates to the database.

Regardless of how many updates it initiates, every transaction must be atomic, consistent, isolated and durable:

Atomicity: A transaction must be "all-or-nothing": either the entire transaction is effective, or the transaction has no effect. If the transaction succeeds, then its entire effect is reflected in the database. If a transaction fails, then it has no effect on the database.

Consistency: A transaction must not effect changes that cause any of the rules and integrity constraints expressed about data in the database to be violated: it must leave the database in a consistent state.

Isolation: A transaction must execute independently of any other transactions that may be executing at the same time ("concurrently"). It must appear to each transaction that every other transaction executed either before or after itself. The effect on the database of executing a number of transactions concurrently must be the same as if they were executed one after the other ("serially").

Durability: Once a transaction has succeeded, the changes that it has made to the state of the database must be permanent.

Atomicity and durability are preserved by database recovery mechanisms, which handle various types of hardware, software and other system failures. Isolation is preserved by database concurrency mechanisms. Recovery and concurrency are both major subjects in their own right within the even broader field of transaction processing, and all three are individually the subject of entire books. Both types of mechanism are generally applicable to any type of database, although most of the literature naturally focuses on their application to the relational model. Their application to the associative model is essentially no different except for the mechanisms within the database itself that record data and transactions, and I shall do no more than summarise the capabilities that an implementation of the associative model should have.

Recovery

Recovery is the process of returning the database to a consistent, correct state after the failure of some sort. Failures are of three types:

Transaction failure: A single transaction fails to complete, typically due to an error in a program.

System failure: A system failure is one that affects all transactions in progress at the time but does not physically damage the database, such as a power failure.

Media failure: A media failure is one that physically damages the database, such as a disk head crash, and affects transactions that are using the affected portion of the database.

To facilitate recovery, at various times during processing (according to some predetermined scheme) checkpoints occur. When a checkpoint is reached, any data in the system's main memory buffers is written to the disk, and a checkpoint record is written, which comprises a list of transactions still in progress at the checkpoint.

Typically, the log will comprise two portions: an on-line portion, held on disk for immediate availability and containing relatively recent transactions, and an off-line portion, help on a backup medium and containing less recent transactions.

Concurrency

A shared database may execute transactions serially or concurrently. In serial mode, transactions are executed one at a time, and a transaction can begin to execute until the previous one has completed. All the resources of the database are available exclusively to each transaction, and there is no possibility of one transaction interfering with another. This is straightforward, but is also an inefficient use of resources.

In concurrent mode, many transactions may execute concurrently, and the individual reads and writes of data which they initiate are interleaved. This uses resources more efficiently, but introduces the possibility that one transaction may interfere with another, which can give rise to three types of inconsistencies. Suppose two transactions, Give and Take, both need to change your bank balance:

Dirty read: Give reads your balance as £500, adds £200, and writes it back as £700. Before Give commits, Take reads your balance as £700. Then Give fails, rolls back and restores your balance to £500. The value of £700 read by Take is no longer true. Take has the wrong data.

Lost update: Going on from there, having read your balance as £700, Take subtracts £100, writes it back as £600 and commits. Then Give fails, rolls back and restores your balance to £500, where it was before Give started. Take has been lost, and you have gained £100.

Unrepeatable read: Give reads your balance as £500 but has not yet changed it. Meanwhile Take updates the balance to £400. Give now needs to re-read your balance: it finds £400 instead of £500, which is inconsistent.

Security

A database needs to know who is authorised to control access to it, and who in turn has been granted authority to access to it. This is achieved by mechanisms that allow a designated administrator to enrol users by name, and to grant authority to them to create, delete, change, use and view database objects. Authorities may be granted to users individually, or users may inherit authorities granted to groups into which they are enrolled. Broadly, users are characterised as:

Developers, who may change meta-data, and

Application users, who may not change meta-data but may change data. (From this standpoint, implementers may wish to treat irregular association types as data, not meta-data.)

At a more granular level, authorities may be granted over chapters, entity types, association types and queries.

C. Metacode

To reiterate: Every new relational database application needs a new set of programs written from scratch, because a program written for one application cannot be reused for another. This creates a need for a never-ending supply of new programs, the development of which is labour-intensive, time-consuming and expensive. This fact of software life is universally accepted and rarely questioned, but why is it so, and does it always have to be so?

In a relational database, every relation is structured differently. Each one has a different number of columns, and each column has a different column heading and a different domain. Because of this, programs have to be designed around the relations. Using mainstream programming languages, it is impossible to write an efficient program that is capable of accessing a relation whose structure was not known when the program was written, just as it is impossible to make a key that will open any lock. Every program has to be written by someone with precise knowledge of the relations that it will use, and a program that uses one set of relations cannot be used with a different set.

In a typical commercial data processing application, each business entity is represented by at least one relation, and most applications involve between 50 and 500 business entities, so each new application needs somewhere between 500 and 5,000 new programs to be written from scratch. Even using advanced 4GLs and application development tools, one non-trivial program can still take days or weeks to write and test.

Software Re-use

The systematic reuse of existing, tested program code is the Holy Grail of software development—promising great things, always sought, but never found. Large-scale re-use was one of the key goals of object-oriented development: however, some twenty years after the first object-oriented languages were developed, almost no systematic re-use has been achieved.

(Let me be clear about what I am calling systematic reuse. Since programming began, experienced programmers have reused their own code by taking an existing program as the starting point for a new one, and by cutting and pasting existing code fragments into their new programs. I do not regard this as systematic reuse, which demands the reuse of other programmers' code.)

Two of the most visible attempts to make reuse a commercial reality have been sponsored by IBM. The first was Taligent, a high-profile software venture funded by IBM, Apple and HP. Taligent's objective was to develop a definitive set of reusable components, but the result, CommonPoint, failed to find a market and the company was absorbed into IBM. The second is IBM's San Francisco project, a Java-based collection of components and frameworks that includes hundreds of common business objects plus application-specific components for core business processes.

Commercially, the jury is still out on San Francisco, but it has been in development for some years and changed its underlying technology at least once, so the signs are not encouraging.

Some development tools automate the process of writing programs by re-using not programs but program designs. This was the route that my colleagues and I took with Synon's Synon/2 and Obsydian, and some of our customers achieved productivity levels that were extraordinary by accepted measures: in excess of 1,000 lines of fully 30 tested code per project member (developers plus testers) per day was not uncommon. However, the initial learning curve of such tools is steeper than "traditional" third or fourth generation programming languages, because the programmer has to understand and get to know well structure and behaviour of each of the large and functionally complex building blocks that are at their disposal. Consequently by comparison to traditional programming techniques such tools demand a higher up-front investment in training, and slightly postpone the visible pay-back, so despite their high productivity levels, their use is not widespread, nor is it likely to become so.

The most notable success for systematic reuse has been in the field of class libraries. A class library is a set of classes, each one performing some common programming function, written in an object-oriented language and typically used within the framework of an application development tool. In the Windows environment, the Microsoft Foundation Classes (MFC) class library has become ubiquitous. This concept has also been central to Java from its inception, and much of Java's basic functionality is delivered via the Java Foundation Classes (JFC). Class libraries are not such a clear win for reuse as might be supposed, however. In the Windows environment, the bare Windows API (application program interface—the set of tools and procedures that allow application programs to manipulate the Windows user interface) is so complicated that C++ programming without MFC would be virtually impossible, so the MFC technology has been developed as far as it had to be to make Windows programming feasible, and very little further. Most of MFC deals with constructing the graphical user interface, and most of the rest deals with low-level programming facilities such as communications. JFC covers a broader base of functionality than MFC, but in neither case does the level of abstraction rise far above basic plumbing.

From reuse, the industry's focus shifted in 1998 to component software. This involved re-labelling older ideas and techniques, such as DCOM and CORBA, that were in danger of exceeding their shelf-life. Also, rather like object orientation, component software strategies and tools were developed without any underlying conceptual foundation, with every vendor free to interpret the meaning of "components" to suit their own products. The true benefits of component technology will be realised only when it rises above the level of basic plumbing. Using current database technology, components can only work together when they are designed to do so, which renders the current initiatives futile.

The bottom line is t day reuse succeeds only at the extremes of component granularity: at the bottom end of the scale through the reuse of individual classes in object-oriented languages, and at the top end of the scale through the reuse of entire application packages. In between, it is not clear that a programmer can find, purchase, learn about and tailor a component more cost-effectively than building the same component from scratch. Despite all the research funding and industry attention focused on reuse and component technologies, most programs developed today are still hand-coded, and, even when the starting point is an existing program or a set of classes, the process is still labour-intensive.

Reuse has failed not because our programming languages and tools are deficient, or our programmers are not clever enough, but simply because we do not store our data in a way that permits it. In order to achieve the reuse of code at a level above basic plumbing, we must store data in a consistent way that allows it to be manipulated by generic, abstract programs that can be written by someone without any knowledge of how individual entity types will be structured. This "metacode" is then able to operate on any and every entity type. This approach to programming avoids the need inherent in traditional programming to specify every procedural step explicitly. One of the main objectives of the associative model is to provide a robust metacoding environment. The associative model stores metadata and data side-by-side as links: one simple, consistent format for all entities and associations. It does not need different relations for different entities, or, to look at it another way, all the entities live in the single relation with four columns that holds the links. Having removed the need for the programmer to understand the structure of every entity type, we can now write programs that can operate on any and every entity without modification. This substantially reduces the number of new programs needed for a new application. Also, as more applications are deployed, the proportion of new requirements that can be fulfilled by existing programs increases, so the number of new programs needed decreases still further. Most programmers today continually re-invent the wheel by rewriting familiar programs to work with new relations. Breaking this cycle will significantly reduce the cost of computing.

There is no inherent reason why metacode could not be made to work in the context of the relational model, but it would be much trickier for programmers to understand and use, because it is more difficult for a program to read heterogeneous items from many relations, each with a different number of columns, than to read homogeneous items from one relation of fixed degree. Codd specified that the relational schema—the metadata for a relational database—should be stored in a special set of tables, now generally called the catalog or data dictionary, and this is a feature of most relational databases today. However, tools that use the catalog to allow immediate, interpretive access to databases are not in general use. Metacode is not part of the relational landscape today, nor is it likely now to become so.

Omnicompetent Programming

As we saw earlier, each new relational application needs a new set of programs written from scratch, because a program written for one application cannot be reused for another. Every table is structured differently—that is, it has different columns and column headings—and the programs are designed around the tables. How does the associative model avoid this?

The information that describes how data is stored in a database is called "metadata". Metadata describes the structure and permitted state of data in a database. Structure is concerned with the different types of data that a database may contain, and how the different types of data inter-relate. Permitted state is concerned with the rules which govern the values that data items may take, both individually and with respect to other data items. The metadata that describes a single database is called a schema.

In a relational database, a schema comprises the names of tables and columns and the domains on which the columns are based, information about which columns are keys, and "referential integrity" rules that describe how some data items depend on others. The two different parts of a relational schema are expressed in two different ways: everything except the referential integrity rules is expressed in SQL, and the referential integrity rules are expressed in a procedural language. Each vendor's system uses a different procedural languages for this purpose.

Every application program that accesses a database uses a schema to tell it how the data in the database is structured. Programs obtain schemas in two ways: either the schema is known before the program is written and the program is designed to use the specific schema, or the schema is not known before the program is written and the program reads schemas as it goes and is able interpret and act on anything that finds. A program that is written to use one predetermined and unchanging schema is called "unicompetent". A program that is able to use any and every schema is called "omnicompetent". A good example of an omnicompetent program is a spreadsheet application such as Excel or Lotus 123.

Relational databases comprise varying numbers of dissimilar tables with varying numbers of dissimilar columns, and moreover their schemas are stored separately using two different languages. This makes it very difficult to write omnicompetent programs, and there is no mainstream programming environment for relational database that supports the development of omnicompetent programs. With the exception of a few specialised tools such as report writers, the overwhelming majority of application programs that access relational databases are unicompetent.

By contrast, the associative model stores all types of data, and metadata as well, side-by-side in the same simple, consistent form of items and links. This means that it is easy to write omnicompetent programs using a form of abstract programming called "metacode" that is part of the associative model. Metacode allows us to write programs that can operate on any and every business entity without modification. This substantially reduces the number of new programs needed for a new application. Also, as more applications are deployed, the proportion of new requirements that can be fulfilled by existing programs increases, so the number of new programs needed decreases still further. Most programmers today continually re-invent the wheel by rewriting familiar programs to work with new tables. Breaking this cycle will significantly reduce the cost of computing. The reusability of metacode means that many simple applications can be implemented using existing programs. This opens the door to a much greater involvement of end-users in the creation of applications. Once they become familiar with a core repertoire of omnicompetent programs, many end-users will be able to develop and deploy simple applications without any specialist help.

Standard Program Types

Figure 6:
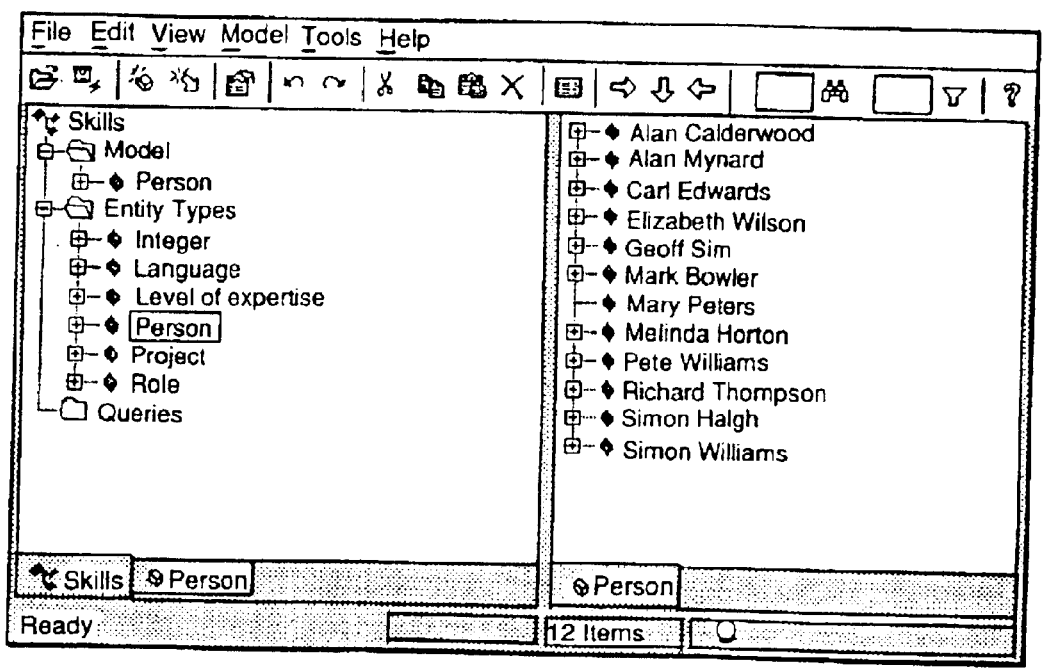
FIGS. 6–12 depict various interfaces which may be useful for constructing a database according to one embodiment of the present invention.

The associative model provides the capability to write omnicompetent programs that are capable of operating on any database schema without modification. What one makes of this capability is a matter of imagination and ingenuity. I present here an overview of the basic user interface that we have developed for Sentences, our own implementation of the associative model, as an introduction to what is possible. The user interface metaphor that we have chosen is the ubiquitous two-pane explorer. We show the schema in the left-hand pane, and instance data in the right-hand pane. FIG. 6 below shows a simple schema designed to record our team members, their various skills and their involvement in our current projects. The left-hand pane lists the six entity types that comprise the schema. The Person entity type is selected, and this causes instances of Person to be listed in the right-hand pane. Selection and filtering capabilities are provided on the right-hand pane to restrict the number of instances presented.

Figure 7:
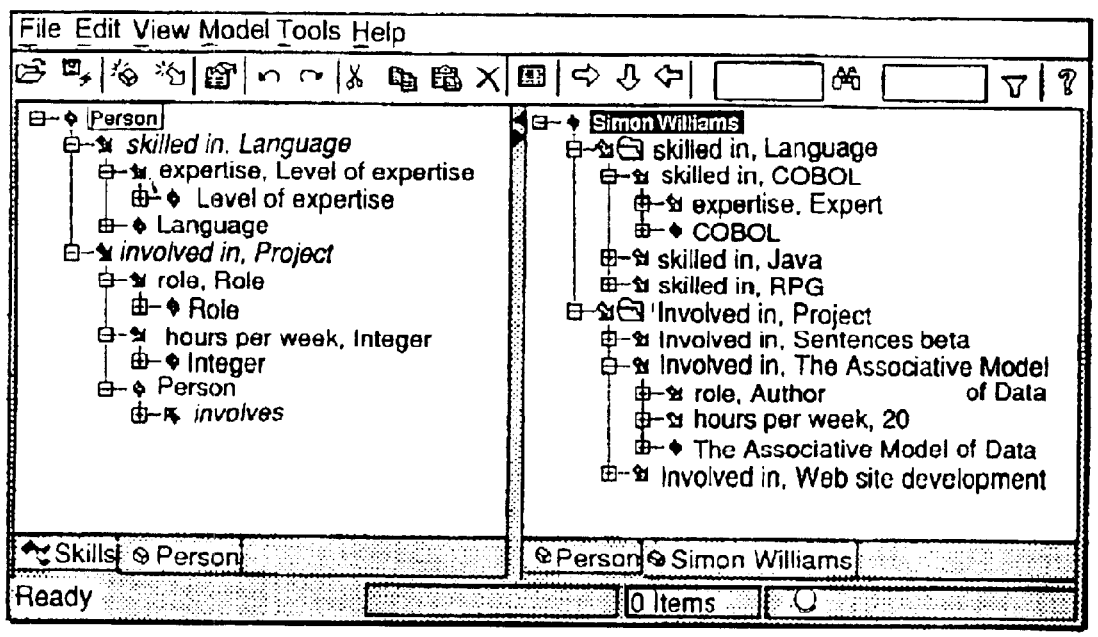

We can open new explorer tabs on both an individual type in the left-hand pane and an individual instance in the right-hand pane, as shown in FIG. 7.

Figure 8:
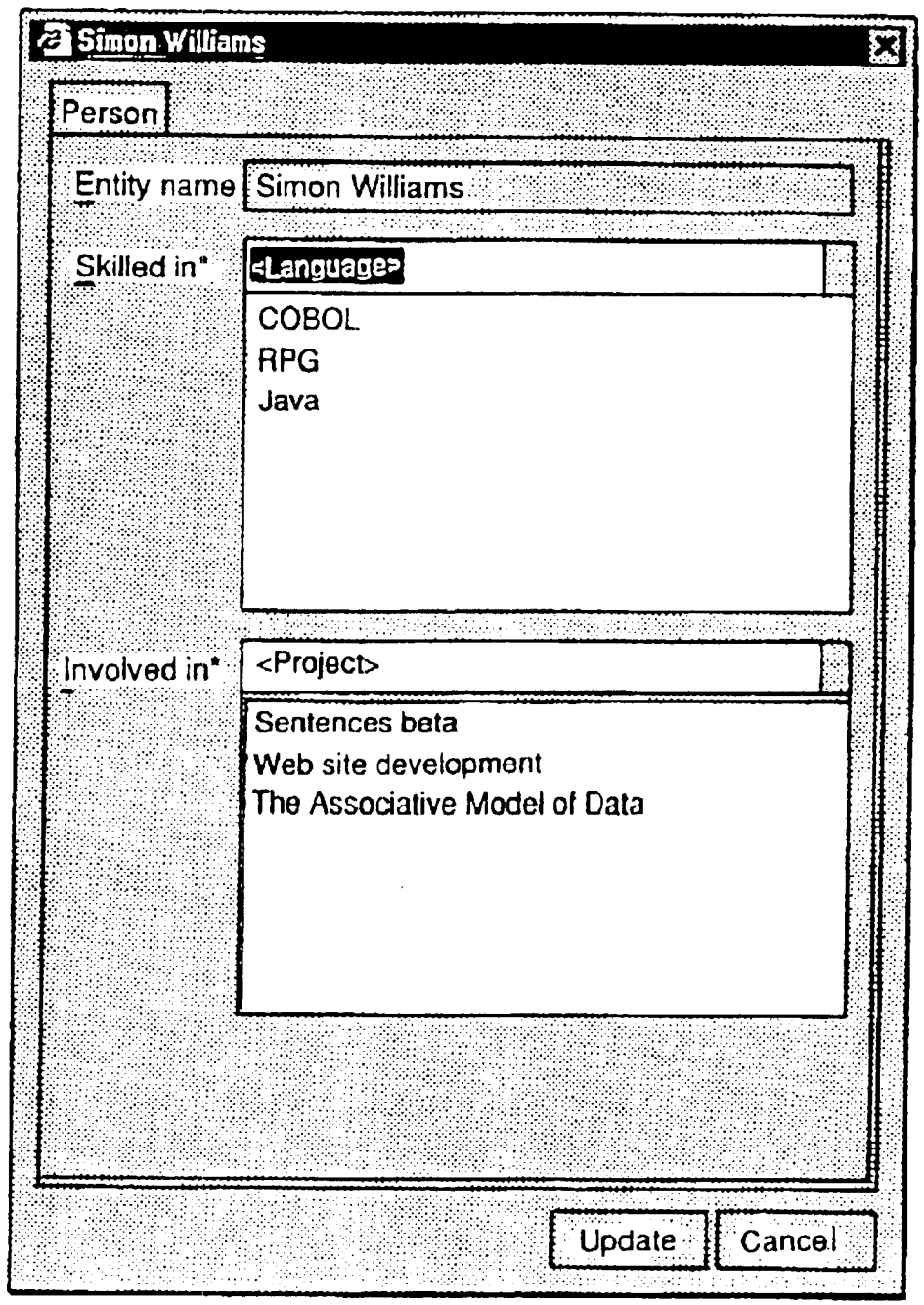
Figure 9:
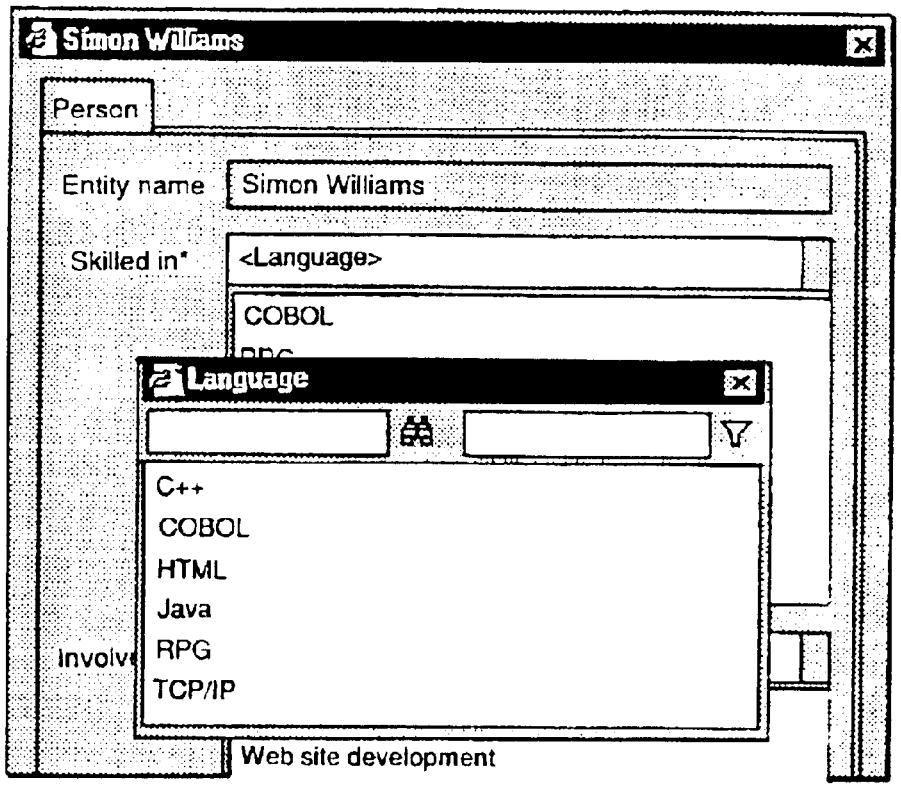

In the left-hand pane, we see the schema for the Person entity type. In 15 our written notation, this is as follows:

Person skilled in Language
... expertise Level of expertise
Person involved in Project
... role Role
... hours per week Integer The cardinality of both Person skilled in Language and Person involved in Project is multiple. In the right-hand pane, we see the instance data for the entity Simon Williams. Again, in our written notation, this is as follows:

Simon Williams skilled in COBOL
... expertise Expert
Simon Williams skilled in Java
Simon Williams skilled in RPG
Simon Williams involved in Sentences Beta
Simon Williams involved in The Associative Model of Data
... role Author
... hours per week 20
Simon Williams involved in Web site development FIG. 8 shows the edit panel that is invoked when we select the Simon Williams entity. This allows us to amend the entity. It enforces cardinality rules, and provides selection capabilities for target entities via the selection buttons shown against each entry field (FIG. 9). Selecting a type rather than an instance and invoking the same function creates a similar panel ready to capture a new instance.

Figure 10:
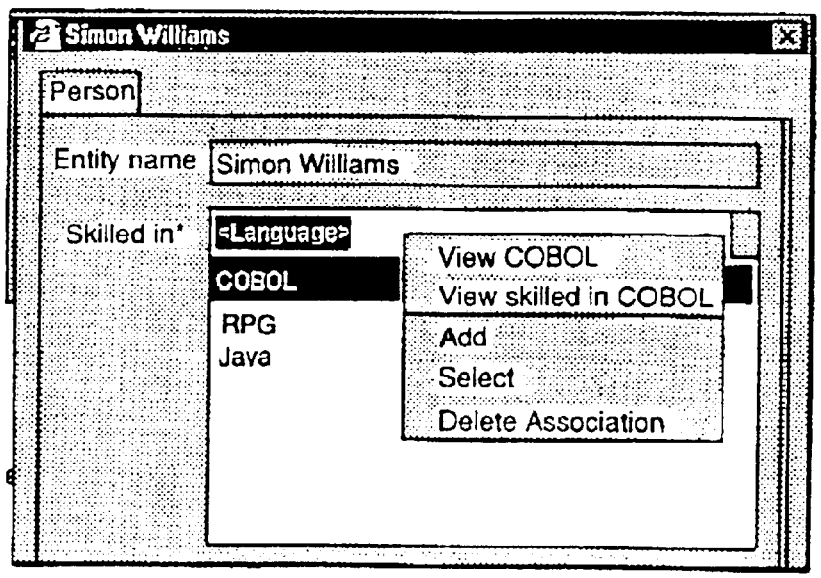
Figure 11:
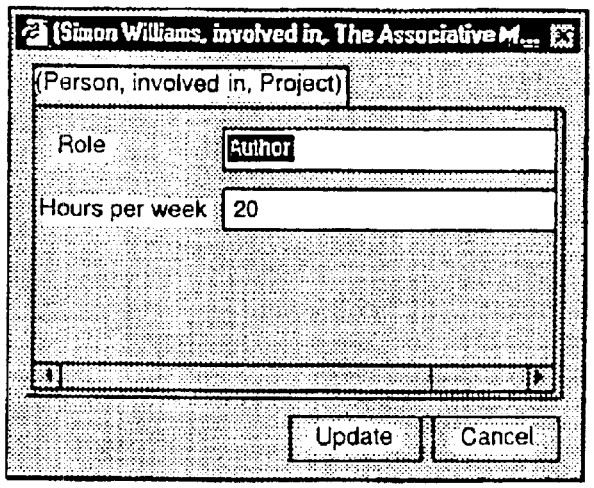

From the edit panel, the right-click menu against any of the associations allows us to invoke the edit panel for the association's target, or for the association itself. FIGS. 10 and 11 show this capability in action for the Simon Williams skilled in COBOL association.

Figure 12:
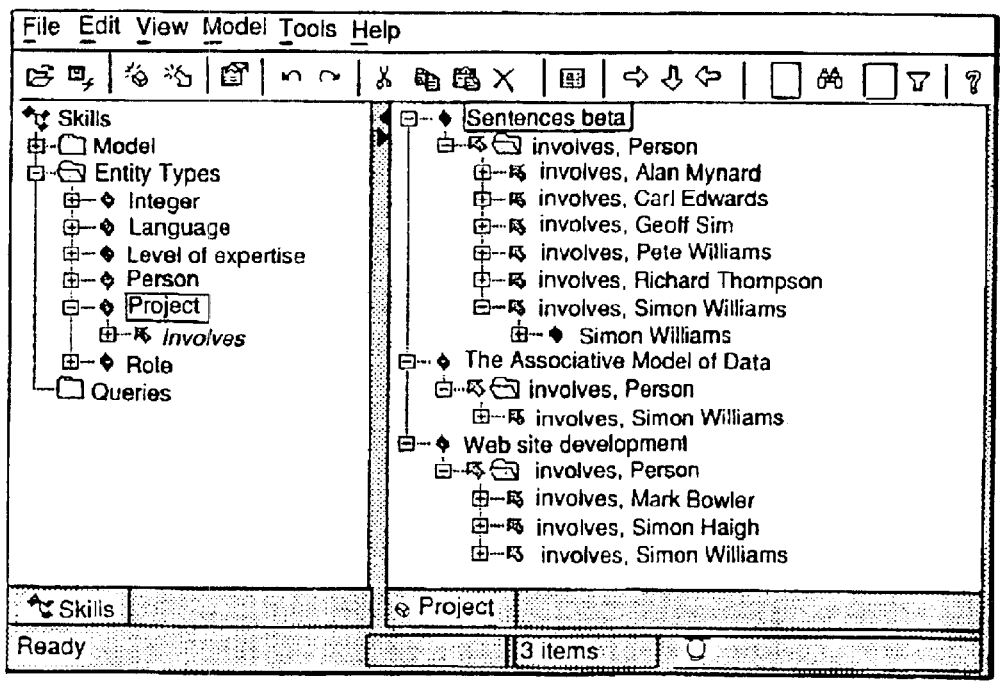

Finally, FIG. 12 shows the associative model's ability to show inverse associations. selecting the Project entity type in the left-hand pane lists the Project instances in the right. Clicking open each in turn immediately shows us the people involved in each project, each being the inverse of a Person involved in Project association.

The vital fact about this illustration, which is not evident from the printed page, is that all this finctionality is available instantly for any and every entity type and association type that we might care to specify. The edit and search panels are assembled "on the fly" by the omnicompetent Java code that we have written to create the meta-application. The tree metaphor is particularly appropriate to the associative model. Visually, the tree is the natural representation of the associative model just as the table is the natural representation of the relational model.

D. Language for the Associative Model

In relational model, SQL functions as both a data definition language for schema definition, and a data manipulation language for update and retrieval.

Associative Algebra

The associative algebra is derived directly from the relational algebra. The operators operate on types, which may be entity types or association types.

The union of two types forms a third type containing all the instances that appear in either or both of the two types.

The intersection of two types forms a third type containing only the associations that instantiate both the two types.

The difference of two types forms a third type containing only the instances that instantiate the first and not the second type.

The product of two types forms a type which is instantiated by all possible associations of instances of the first type as source together with instances of the second type as target.

Select defines a subset of the instances of the original type.

Project forms a type containing a sub-tree of the original type.

The join of two types forms a third type having the first and second types as source and target respectively, where source and target instances share a common instance of a sub-tree.

Divide operates on two types and forms a third, whose type is the source of the first type and whose instances are the sources of instances of the first type that are associated with all the instances in the second type as targets.

Extend forms an association type that has the original type as source and a new type, instances of which are derived from the source, as target.

Summarise forms a type whose instances are formed by grouping together instances of the original type that have the same sub-tree as source, and creating one instance of the new type for each such group, with the sub-tree as source and an instance aggregating corresponding sub-trees of the group as target.

Rename forms a type by renaming one or more of its sub-trees.

Recursive closure forms a relation by joining a self-referencing type with itself, taking the result and joining it again with the original type, as many times as necessary.

Figure 13:
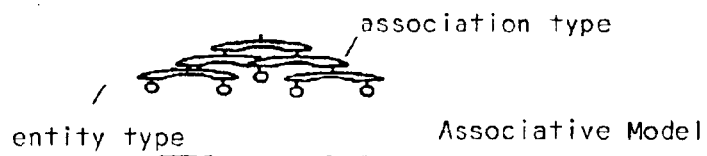
FIGS. 13 and 14 visually represent the structure of one embodiment of the associative model, as described herein.

I use a visual metaphor for the associative model. Picture a set of coat hangers, each one representing an association type, and each one having either an apple, representing an entity type, or another coat hanger hanging from its two extremities, as represented in FIG. 13.

Figure 14:
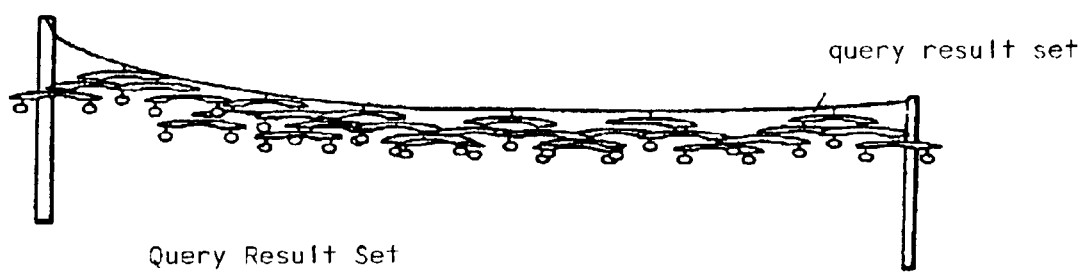

Then I picture the query result set as a washing line with a series of these coat hanger trees hanging from it, with each apple now representing an entity and each coat hanger representing a real or virtual association, as depicted in FIG. 14.

Figure 15:
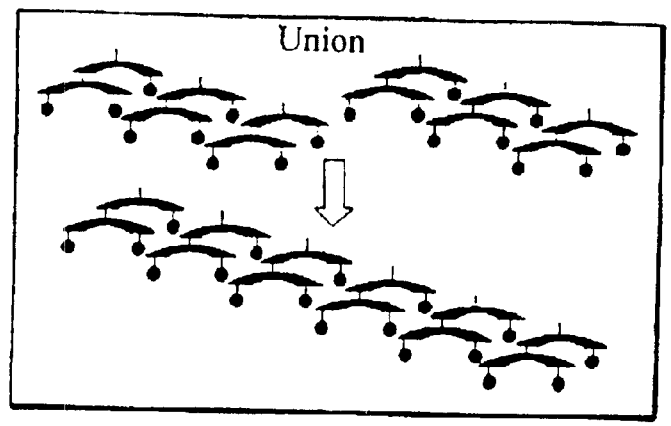
FIG. 15 provides schematic depictions of associative operators as may be applied to data stored by the systems and methods of the present invention.
Figure 15:
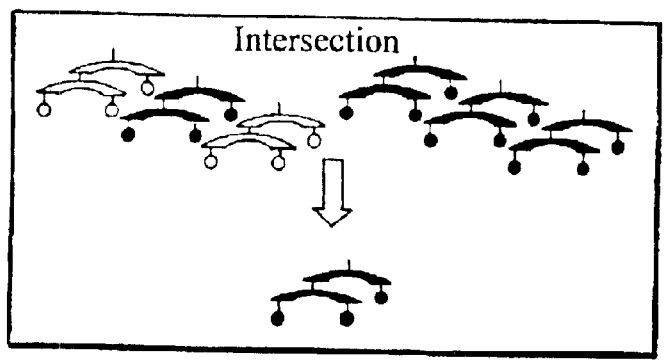
Figure 15:
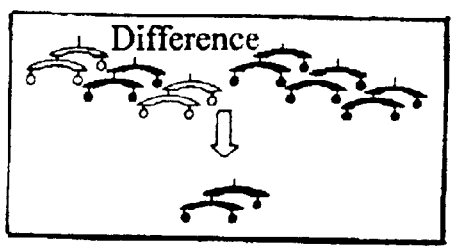
Figure 15:
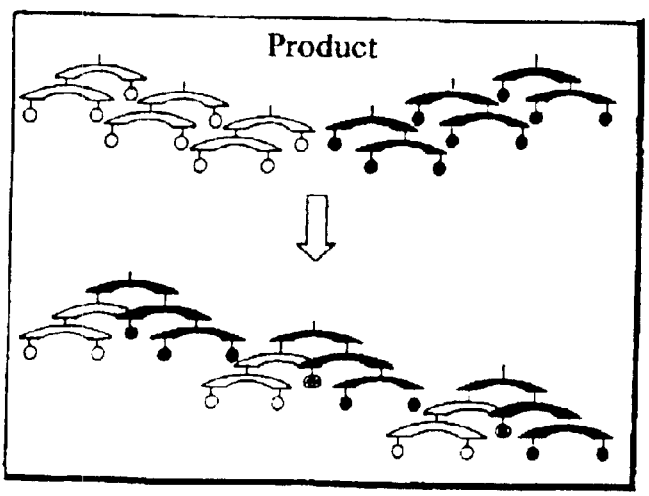
Figure 15:
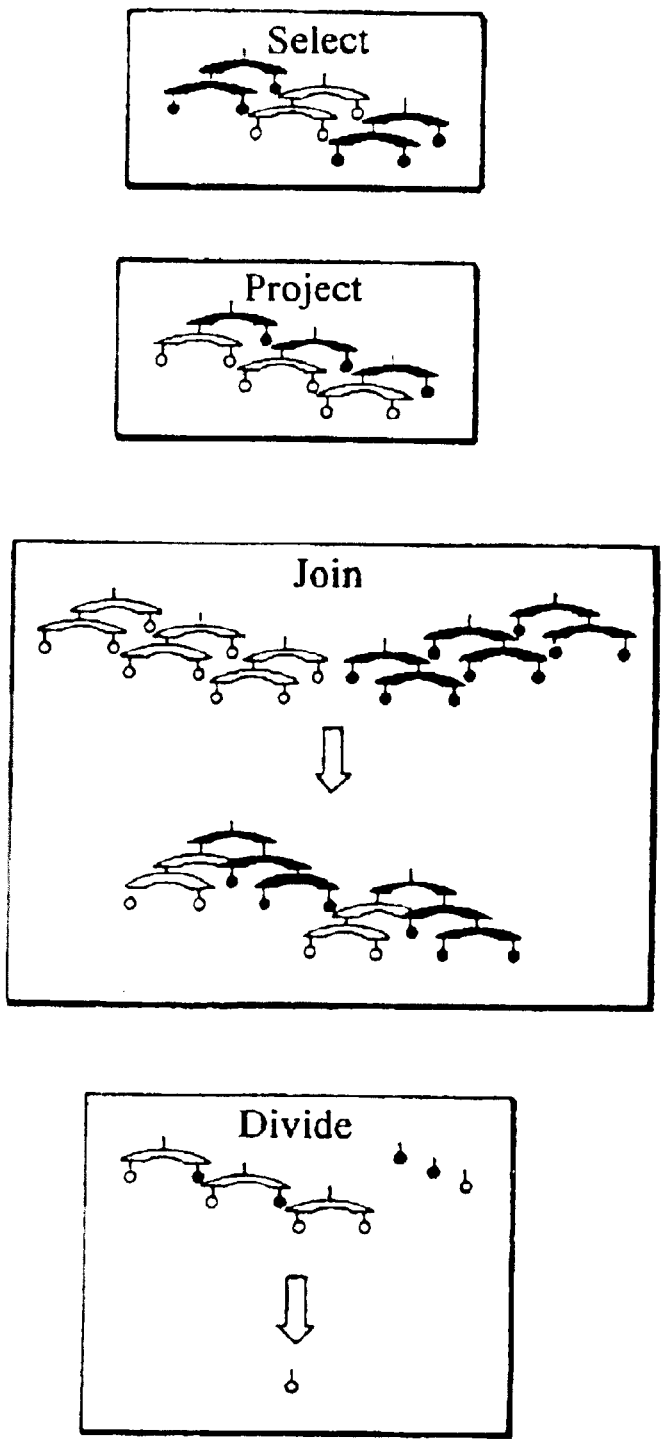
Figure 15:
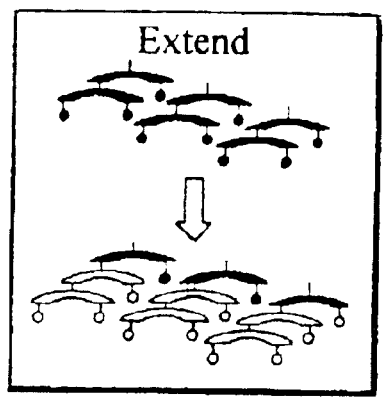
Figure 15:
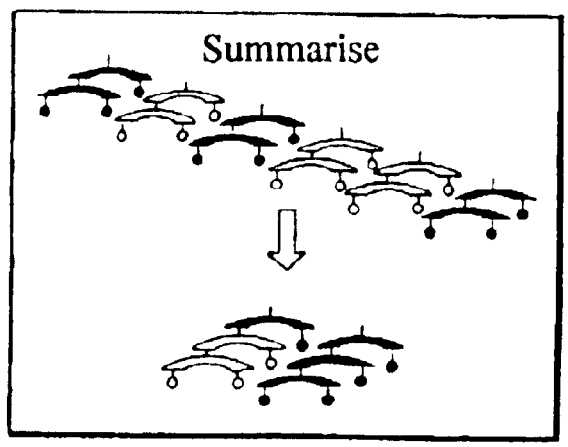
Figure 15:
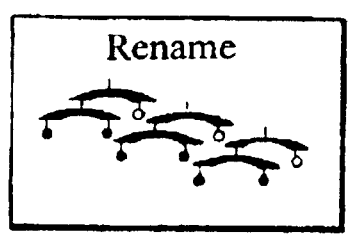
Figure 15:
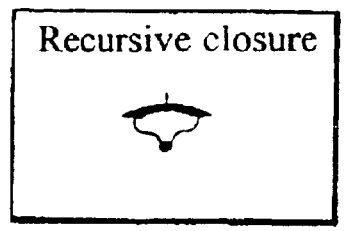
Figure 16:
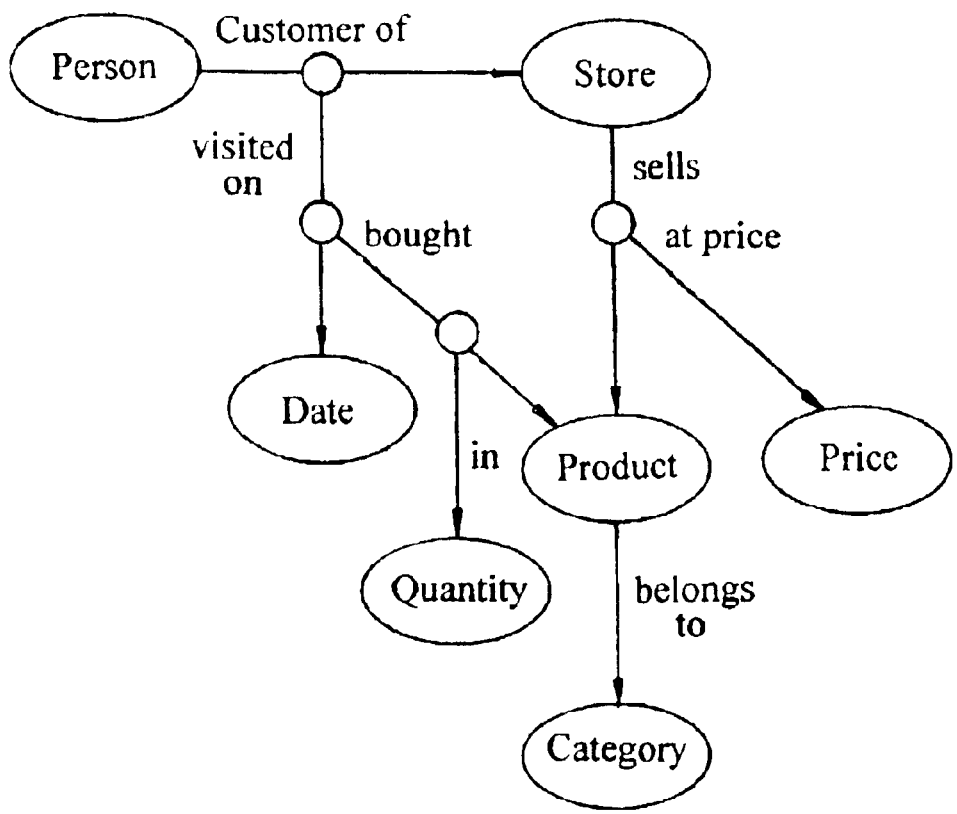
FIG. 16 shows an exemplary schematic diagram for metadata.

FIG. 15 provides pictorial representations of the associative operators:

Closure

The associative algebra treats entity types and association types as the same thing: in effect, they are both subclasses of type. This does not compromise the closure property in the associative algebra, because every operation on a type produces another type. In this context, an entity type may be regarded as analogous to a relation of degree 1, and an association type analogous to a relation of degree>1. Two of the relational operators are sensitive to degree: divide operates only on one unary and one binary relation, whilst project is meaningless (or at least is capable only of producing an identical relation or an empty relation) on relations of degree 1. This is not held to compromise the closure property of the relational algebra.

Implementation

The mechanism for querying a triple store was first described by Feldman in a technical note called "Aspects of Associative Processing" written at the MIT Lincoln laboratory, Lexington in 1965. He used the term 'simple associative forms' to describe the seven ways in which triples could be retrieved:

| (a, b, ?) | (a, ?, c) | (?, b, c) |
| (a, ?, ?) | (?, b, ?) | (?, ?, c) |
| (a, b, c) | | |

Each returns a set of triples whose source, verb and target match the values supplied as 'a', 'b' and 'c'. Other authors have discussed the concept, including Levien and Maron in "A Computer System for Inference and Retrieval" CACM Vol. 10, 1967; Feldman and Rovner in "An ALGOL-based Associative Language", CACM Vol. 12, 1969; Sharman and Winterbottom in "The Universal Triple Machine; a Reduced Instruction Set Repository Manager", Proceedings of BNCOD, 1981; and Frost in "Binary Relational Storage Structures", Computer Journal Vol. 25, No 3, 1982. Sharman and Winterbottom also point out similarities with Prolog.

The simple associative forms remain the foundation of querying under the associative model, but they are leveraged and extended with a number of additional mechanisms. In particular, the fundamental capability under the associative model for the source or target of an association (i.e., triple) to be another association significantly increases the expressive power of the associative model, and hence the scope and sophistication of queries that may be performed over an associative database. Our own implementation of an associative database uses a grid file to store items and links, accessed by R-tree spatial index. See J. Nievergelt, H. Hinterberger and K. C. Sevcik, "The grid File: An Adaptable, Symmetric Multikey File Structure", ACM Transactions on database Systems, Vol 9, No 1 (1984), and A. Guttman, "R-Trees: A Dynamic Index Structure for Spatial Searching", ACM SIGMOD 1984.

Querying

The associative model has query capabilities equivalent to those of the relational model, schematically depicted in FIG.

16. We will consider some examples using the associative algebra. For practical purposes, a language is required. SQL can be readily adapted to the associative model, and has the advantage of familiarity.

This schema reads as follows:

```
Person customer of Store
    . . . visited on Date
        . . . bought Product
            . . . times Quantity
Store sells Product
    . . . at Price
Product belongs to Category
```

Here is some data:

```
Mary customer of Safeway
    . . . visited on 25-Sept-99
        . . . bought Cornflakes
            . . . times 2
        . . . bought Coffee
            . . . times 1
        . . . bought Yoghurt
            . . . times 6
    . . . visited on 1-Oct-99
        . . . bought Milk
            . . . times 3
Bill customer of Tesco
    . . . visited on 3-Oct-99
        . . . bought Yoghurt
            . . . times 10
Safeway sells Cornflakes
    . . . price £1
Safeway sells Coffee
    . . . price £2
Safeway sells Milk
    . . . price £0.60
Safeway sells Yoghurt
    . . . price £0.30
Tesco sells Yoghurt
    . . . price £0.32
Cornflakes category Cereals
Coffee category Beverages
Milk category Dairy
Yoghurt category Dairy
```

Now, some queries:

An easy one first. Who shops at Safeway?
Q: Select (Person customer of "Safeway")
A: Mary customer of Safeway Now a little more complex. What dairy products has Mary bought?
Q: Select (((("Mary" customer of Store) visited on Date) bought Product) join (Product category "Dairy"))
A: (((Mary customer of Safeway) visited on Sep. 25, 1999) bought Yoghurt) join (Yogurt category Dairy)
(((Mary customer of Safeway) visited on Oct.1, 1999) bought Milk) join (Milk category Dairy)

This example uses the join query operator. When two types are joined, a new association type is formed:

<Type 1> join <Type 2>

When the query is executed, instances of this association type are created. These instances do not persist in the database, but are created afresh each time the query is executed. They are called virtual associations. We shall discuss the precise implementation of join later, but broadly the creation of a virtual association is prompted by the occurrence of the same instance on both sides of the join prescription. In the example above, the virtual associations are created on Yoghurt and Milk respectively.

Now some calculations. How much did Mary spend (in any store) on Sep. 25, 1999, and how many products did she buy? This is quite a complex query, so we will split it into its various stages. The first step is to determine how much of what Mary bought on Sep. 25, 1999, which is the query:

Q: Select (("Mary" customer of Store) visited on "Sep. 25, 1999") bought Product) times Quantity)
A: ((Mary customer of Safeway) visited on Sep. 25, 1999) bought Cornflakes) times 2)
   ((Mary customer of Safeway) visited on Sep. 25, 1999) bought Coffee) times 1)
   ((Mary customer of Safeway) visited on Sep. 25, 1999) bought Yogurt) times 6)

Next we need to know prices, so we join the result of this query with another:

Q: Select (("Mary" customer of Store) visited on "Sep. 25, 1999") bought Product) times Quantity) join ((Store sells Product) at Price)
A: ((Mary customer of Safeway) visited on Sep. 25, 1999) bought Cornflakes) times 2) join ((Safeway sells Cornflakes) price £1.00
   ((Mary customer of Safeway) visited on Sep. 25, 1999) bought Coffee) times 1) join ((Safeway sells Coffee) price £2.00
   ((Mary customer of Safeway) visited on Sep. 25, 1999) bought Yogurt) times 6) join ((Safeway sells Yogurt) price £0.60

Now we are ready to do some calculations, using the Group operator, and defining some expressions:

Q: Summarise ["spent"=Sum{quantity*price}; "bought products"=Count{}], Select (((("Mary" customer of Store) visited on "Sep. 25, 1999") bought Product) times Quantity) join ((Store sells Product) at Price)))
A: ((Mary customer of Safeway) visited on Sep. 25, 1999) spent £7.60 ((Mary customer of Safeway) visited on Sep. 25, 1999) bought products 3

In each of our examples, the result set comprises associations. What if we want a set of entities instead? Going back to our first example, "Who shops at Safeway?", we might have preferred to write:

Q: Project Person from Select (Person customer of "Safeway")
A: Mary

We can then go on to operate on sets of entities with set operators.

Figure 17A:
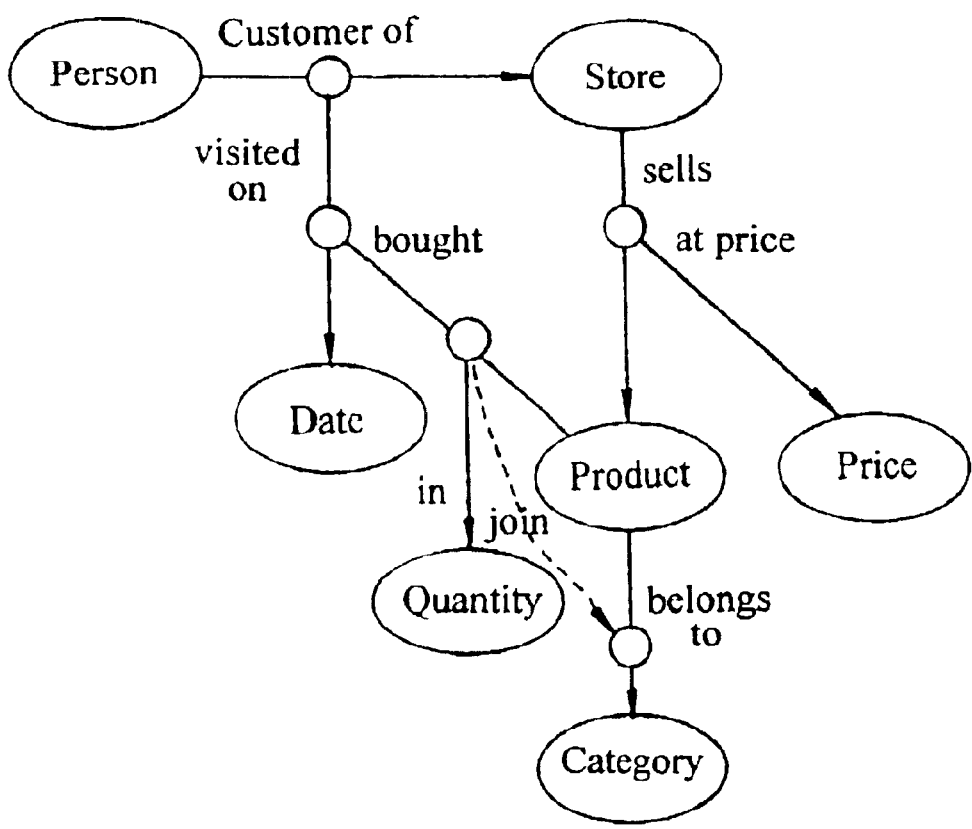
FIGS. 17A and B depict the interactions of join queries with the metadata of FIG. 16.
Figure 17B:
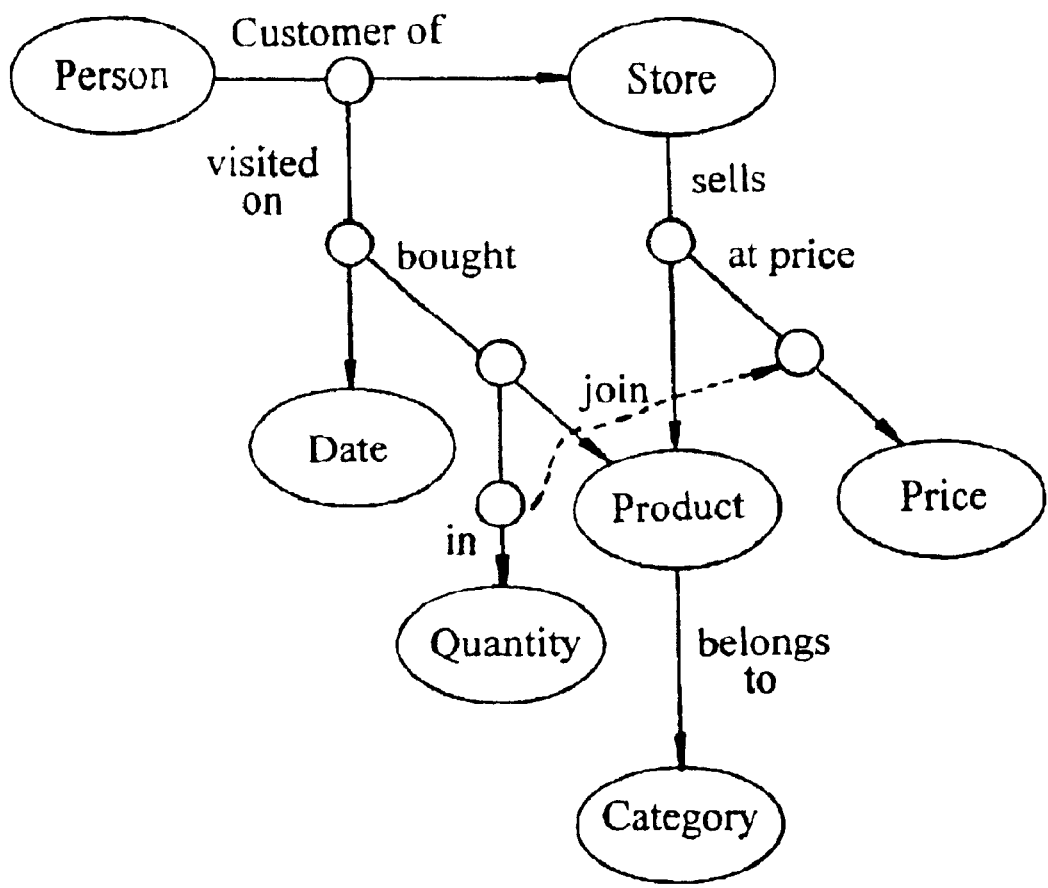

Who shops at either Safeway or Tesco?
Q: Union (Extract Person from Select (Person customer of "Safeway")) and (Project Person from Select (Person customer of "Tesco"))
A: Mary
   Bill Before we leave our examples, let's take a closer look at the virtual associations created by join and certain other query operators. It is useful to env isage these as association types in the diagram. FIG. 17A depicts the jointhat we created to discover wh at dairy products Mary had bought. FIG. 17B illustrates the join that we created to work out what Mary had spent.

Variables

In the examples above, the names that appear are those of entity types: in the query Person lives in "America", Person is the name of the entity type that is the source of the Person lives in Country association type. However, in queries, such names are not entity types, but variables. When a query is executed, its variables are populated by result sets. So when we execute the query Person lives in "America", the variable person becomes populated by the instances of the entity type Person that have lives in "America" associations. Variables are the mechanism that allow the members of a result set can be referenced at higher levels in the query.

The underlying type of a variable is always known from the association type that was used to define the query. This means that variables can be renamed without altering the definition of the query. So instead of Person lives in "America", we could have written American lives in "America".

Entity types do not need to be renamed in order to behave as variables: the type names themselves also act as variable names. Variable names are introduced to add meaning.

E. Features of the Associative Model

The associative model will seem challenging and controversial to database practitioners schooled in the relational model. This chapter discusses some of its more significant features.

Abandoning the Record

The associative model does not use records. From punched cards through to the object and object/relational models, the basic unit of data storage has been a record that comprises all of the individual pieces of information about an object or an entity, stored contiguously. The chief argument in favour of the record has been efficiency: given that visiting the disk is a slow, mechanical process, the more data that can be retrieved during each visit the better.

Efficiency has been at the forefront of concerns about the binary model, and hence the associative model also, because both models abandon the record-based approach used by all the other data odels in favour of storing data items individually. But as the power of hardware continues to increase, absolute efficiency is progressively sacrificed to gain other benefits, as happened in the evolution of programming languages from machine code through assembler to third and fourth generation languages. In this light, the benefits of adopting a more granular approach to data storage and retrieval—that is, storing data in smaller units—should now be considered.

A record comprises all of an entity's data items, stored contiguously. The concept of the record originates with and is best exemplified by the punched card. On a card columns 1 through 20 might have held the customer's name, columns 21 through 30 their outstanding balance, 31 through 40 their credit limit and so on. The record is an explicit feature of the hierarchical and network data models, and closely corresponds to the tuple in the relational model. Abandoning the record is rather like cutting up each punched card into vertical sections, 1 through 20, 21 through 30 and so on, and maintaining an index of where to find each section. This means that an entity's data items are no longer necessarily stored contiguously (either conceptually or physically) and so to retrieve all of them usually requires more than visit to the disk, whereas a record comprising all of an entity's data items can usually be retrieved in a single visit, as a punched card could be read in one operation.

To this extent non-record-based models (I shall call them granular models) are inherently less efficient than record-based models, including the relational model. However, the margin of difference is not so great as might be thought. In a well-normalised relational database, most relations contain a fairly high proportion of foreign keys—in certain types of complex transactions such as sales orders, it is not unusual to find foreign keys in more than half the columns. Working interactively, good user interface design dictates that some meaningful data is presented from each tuple whose primary key appears as a foreign key, so that the user can have visual confirmation that the application has got it right. For example, if customers are identified by account numbers, and an order carries an account number as a foreign key, it would be usual to present the customer's name alongside the account number. Similarly, working in batch mode, it is often necessary to retrieve the tuples identified by foreign keys in order to get the full picture about an entity: in extending a sales order to create an invoice, prices, product descriptions, discount rates, sales tax rates so must all be retrieved by means of foreign keys. The bottom line is that at least one additional tuple is likely to be retrieved for every foreign key.

In a modern, well-normalised sales order processing application, it is not unusual to find that tuples must be retrieved from a dozen or more different relations in order to present a single sales order on the screen. Suppose that such an order comprises one header tuple with twenty columns, plus ten detail line tuples each with eight columns, where half of the columns in each relation are foreign keys. Under the relational model, the number of tuples that need to be retrieved to assemble the whole order is not the number of tuples in the order—11—but this number plus one for each of the 50 foreign keys, giving a total of 61. Under the granular model the number of items and links to be retrieved approximates to (depending on the exact design) the original number of columns—100—plus one for the target of each column, giving 200 in total. So although in practice granular models are indeed less efficient in minimising disk accesses than record-based ones, the margin of difference is not nearly so great as it might appear to be: in this case, just over three to one. Anyone who uses the relational model has already accepted a substantial trade-off in efficiency; if minimising disk access was the sole consideration, sales orders would be stored in un-normalised form. Each could then be retrieved in a single visit to the disk, yielding a margin of efficiency over the relational model of more than sixty to one.

Most software innovators agree that it is important not to under-estimate by how much the power of hardware will increase during the lifetime of their product, and consequently how the trade-off between functionality and performance will alter. In terms solely of the amount of work that a computer has to do to present a screen-full of information to a user, the relational model is more efficient than the associative model. But the same can be said of second generation programming languages compared to third generation. As computer power becomes ever cheaper, the right question to ask is not "Is A more efficient than B?", but rather "How much benefit does B offer in return for the cost of some of A's efficiency, and is the trade worth it?". From this more enlightened standpoint, the associative model wins.

Distinguishing Entities and Associations

The associative model divides things into two sorts: entities and associations: entities are things that have discrete, independent existence, whilst associations are things whose existence depends on one or more other things. Previous data models have made no useful distinction between the two, or, to be more precise, have demanded that associations be modelled as entities if their properties are to be recorded. The associative model acknowledges the distinction as one that occurs in the real world, and thus one that allows the creation of more accurate models of the real world. As we discussed in Chapter 5, a series of benefits flow from this.

One of Codd's principal objection to the binary model is that, in his words, one person's entity is another person's relationship, and there is no general and precisely defined distinction between the two concepts. I disagree. Firstly I believe that most sensible people, once the distinction is pointed out to them, are readily able to decide whether something is an entity or an association. Secondly it is possible to define the distinction between entities and associations in a simple, reasonably intuitive but nevertheless rigorous way. Such design decisions are almost trivial compared to some of the decisions a relational practitioner is called upon to make when designing base relations.

Codd also objects to the entity-relationship model on the grounds that it does not allow associations to have properties. He is quite right to do so, and the associative model rectifies this, without requiring that they be modelled as entities. However, much of Codd's ammunition is wasted because the version of the binary model at which he aims his criticisms is not the one contemplated by most researchers. Codd assumes that there is one distinct two-column table per entity per association type, and the two columns of each table are the two associated entities. In fact, most interpretations of the binary model assume that the association type forms the third column, and as we shall see, when this is the case a relational schema comprising any number of relations can be represented in the binary model by just two relations in total: one for entities, one for associations.

Using Pointers, Not Values

The associative model recognises scalar values and strings as things in their own right, with independent existence and identity, instead of as isolated values that represent objects. This approach substantially reduces the amount of work needed to execute queries, and has other benefits—if today's databases had incorporated this capability, the Millennium bug would have been resolved with a fraction of the resources actually consumed. However, the approach depends at a fundamental level on the use of pointers to values instead of values themselves, and this is contentious. Both Codd and Date have issued stern injunctions against the use of pointers in the relational model. Date has taken the argument furthest in his book "Relational Database Writings 1994–1997", which contains two chapters on pointers and a third on object identifiers, and he describes the introduction of pointers into relations as the Second Great Blunder[2].

The question at the heart of the issue is whether pieces of data should be represented in a database solely by values, in accordance with Codd's information feature for the relational model, or by pointers to variables that contains a value in accordance with the associative model, or either at the user's election.

There is also a secondary question of whether things whose properties are recorded in a database should be identified by keys or by surrogate keys. A key is some unique combination of a thing's existing properties, whilst a surrogate key is a new property assigned as the thing enters the database, solely for the purpose of identifying it and for no other purpose.

Surrogate keys look like object identifiers (as they are commonly used in the object model) in many respects, but Date makes a distinction between surrogate keys and object identifiers and rightly concludes that, whilst object identifiers perform some of the same functions as surrogate keys, they carry a lot of additional baggage with them, and thus are not the same thing as pointers.

Codd excludes pointers from the relational model because he believes that both programmers and end-users find them difficult to understand. He cautions us that "the manipulation of pointers is more bug-prone than is the act of comparing values, even if the user happens to understand the complexities of pointers." However, Codd also makes it clear that his prohibition extends only to pointers that are visible to users: "It is a basic rule in relational databases that there should be no pointers at all in the user's or programmer's perception." (My italics.) He goes on to concede that "For implementation purposes, however, pointers can be used in a relational database management system 'under the covers', which may in some cases allow the DBMS vendor to offer improved performance."

[2]The first Great Blunder, in Date's view, was the perception that relations—or, to be precise, the intensions of relations, or relvars as Date calls them—are equivalent to object-oriented classes.

In "Foundation for Object/Relational Databases: The Third Manifesto", Date and Darwen issue a specific proscription, namely "No value shall possess any kind of ID (identifier) that is somehow distinct from the value per se", and consequently reject the notions that other objects might make use of such IDs to share values and that users might have to de-reference such IDs, either explicitly or implicitly, in order to obtain values. ("De-reference" means to retrieve whatever it is that a pointer points to.)

Regarding the use of pointers in the relational model, I agree with Codd and Date, with the exception of a single caveat which I shall describe in a moment. First I shall attempt to sum up a wide issue in a few words. Firstly the relational model has no need of visible pointers to achieve its goals and moreover was explicitly designed to dispense with them, and secondly the relational model relies extensively on the use of predicate logic to compare values directly, and this function is undermined and rendered more complex by the use of pointers. Certainly you can add pointers to the relational model, but to do so would be a significant departure from the relational model, and the clear and sturdy conceptual basis of the relational model would be degraded. If the modification adds value without undesirable side-effects, well and good. However in this case the case for the added value is not clearly made, and the side-effects have not been explored, and at some point the custodians of a conceptual model must defend it from further degradation. Now for the caveat. The relational model's use of primary and foreign keys has sufficient similarities to a pointer mechanism (albeit one entirely exposed to the user) to cause me to wonder whether Codd and Date protest too much. Moreover, as a pointer mechanism it is fragile: unless the prohibition of duplicate tuples in relations is rigorously enforced, which it is not in many commercial implementations of the relational model, one cannot guarantee always to be able to unambiguously de-reference a foreign key.

Date's aversion to pointers does not extend to surrogate keys. In the context of the relational model, a surrogate key is a key like any other and identifies a single row, but it is not composite, it serves no other purpose and is never reused, even after the thing that it identifies is removed from the database. In "Relational Database Writings 1994–1997" he says "Surrogate keys are a good idea (frequently, if not in variably . . . ). More specifically surrogate keys can help avoid many of the problems that occur with ordinary undisciplined user keys." So, the associative model's use of surrogate keys that are invisible to both the programmer and the user, and are not object identifiers, doesn't of itself violate the principles that Codd and Date have articulated. (Date doesn't say explicitly whether a row with a surrogate key would be identified within a database solely by its surrogate key, or by the name of its relation together with surrogate key. He perhaps implies the former by saying that surrogate keys would never be reused, but this further implies that there must be a way to infer from a surrogate key the name of the relation in which it can be found.)

Where the associative model is most fundamentally at variance with the relational model is in the second question: should data be represented by values, or pointers to variables, or either? The relational model, in accordance with Codd's information feature, does only the former. The associative model does only the latter. There are two cases to consider: where the database is representing relationships between one entity and another (which the relational model implements using foreign keys) and where the database is storing a scalar value or a string. Before you pass judgement, I shall examine the associative model's behaviour more closely.

Within any reasonable problem domain, the integer $12.00 the monetary value $12.00 or the string "Qwerty" all have unequivocal identity. They also qualify as entities according to our test: there is nothing in the real world which, if it ceased to exist immediately, would render the thing in question non-existent or meaningless. They also each have an obvious identifier, which is their own value.

Most modelling systems and programming languages (except Smalltalk) do not treat scalars and strings as objects or entities: instead they use a value that represents the object. But there is a crucial difference between the entity that represents the decimal integer 100, and the different values that may also be used to represent it, such as 100, or 100.00, or 000000100.0000000, or 1.00E+002. To illustrate the point, we simply have to alter the number system that we are using from decimal to hexadecimal, and the values then refer to a different integer entirely.

Suppose we are building a database that stores addresses. If we put the string "London" in several different columns of several different relations, each time we enter the string again we create an entirely new representation of it, and the database makes no attempt to see if it has already stored the string "London" before, or to try and re-use it. So we may end up with the string "London" stored, say, 1,000 times in the database.

There is nothing to say whether all these values refer to one town, or to more than one—our database may refer to any number of towns called London between 1 and 1,000. If one of these Londons were to change its name, first we would have to locate each one, and then decide whether it was the one which had changed its name or not. The mechanism that the relational model provides to address this is to allow us to create a relation called Towns, and within it a tuple for each different London. The primary key of each tuple can then be used as a foreign key in various tuples of other relations to refer back to the appropriate London. However, as the issue arises every time for every scalar and every string, it is fair to say that whilst the relational model does not prohibit this approach, if it had wished to endorse it, it would have made it much simpler to implement. Thus in practice if not in theory, it prohibits it.

These observations are equally relevant when we are dealing with, say an amount of money or a date; however there is usually less scope for ambiguity with scalar values. "Jan. 1, 2000" or "$100" are pretty unambiguous whether they occur as the identity of instances or as values. But there is still a world of difference between a value that represents an instance and the instance itself. If our database had stored identities of dates instead of dates as values, the Millennium bug would have had a fraction of the impact that it is currently having.

Moving Away From Object Orientation

The associative model is intentionally not object oriented and is not compatible with the object model of data. Object orientation is a powerful and important programming technique. But the guiding principle behind its invention was to restrict or prohibit access to data in main memory in order ensure its integrity. In fact, to borrow Date's words from "Relational Database Writings 1994–1997", "The 'object model' is a storage model, not a data model." Date puts the phrase "object model" in quotes because, as he points out, there is no universally agreed, abstract, formally defined "object model". This is simply not an adequate starting point for tools whose primary function is to provide, in Codd's elegantly simple phrase, shared access to large data banks. It should not be inferred from this that the associative model is not compatible with object-oriented programming languages: nothing could be further from the truth. To use an object-oriented programming language in conjunction with a database based on the associative model (or, indeed, on the relational model) is simply to acknowledge that relatively small amounts of transient data in a computer's memory should not necessarily be organised, managed or protected in the same way as significantly larger volumes of persistent data in a shared database.

Our own implementation of the associative model is written in Java, and its APIs are delivered as Java packages.

Re-asserting the Nature of the Problem Domain

The associative model reasserts the nature of the problem domain that database management systems should be addressing. Over the past decade, object oriented database technology has failed to find a commercially sustainable market either as a repository for multimedia files or as persistent storage for object-oriented programming languages.

The opportunity for the next generation of database management systems lies not with objects or universal servers, but in using vastly increased hardware resources to improve on the way that we store and query our core, mission-critical enterprise and transactional data, on which the financial and sometimes physical well-being of enterprises and individuals depends.

F. Benfits of the Associative Model

Many people would argue that the relational model has served us well for many years, and, with some enhancements to incorporate the useful features of the object model, it can serve us equally well for many years more. Others would argue that the way ahead lies with the object model, which is in the process of developing a consistent conceptual basis and acquiring the features that the market demands of industry-strength database management systems. Or perhaps some would even argue that database management systems are receding in relative importance amidst the new wealth of middleware capabilities, and the cost of any change at all to the status quo is unlikely to be justified.

So does the database landscape need to change? If so, does the associative model have a role to play in that change? This chapter examines the key tangible business benefits that the associative model offers.

If Your Programs are So Expensive, Why Can They Only Do One Thing?

According to the magazine Information Strategy, the one hundred biggest users of information technology in Europe spent, on average, 2.75% of their revenues during 1998. In the finance sector spending levels of greater than 5% of revenue are common: four of the top five spenders are in this bracket. In some sectors, the cost of maintaining competitive systems is now driving mergers and acquisitions. Graphical user interfaces, client/server computing and the Internet have all increased the complexity and risk of application development, and costs have grown correspondingly.

The escalating cost of application development has brought about a significant reduction in the number of users developing their own applications. In the days of host-based, green-screen applications, software development was simpler, cheaper and less risky than it is today. It was not unusual for quite modestly-sized companies to develop custom applications whose scope might extend up to that of today's ERP systems. Many users regarded packages as a compromise: if applications could enhance competitive edge, it followed that using the same package as your competitors would sacrifice an opportunity to outpace them. But attitudes have changed. In parallel with rising development costs, the range of industry-specific application packages has expanded, so today custom development is usually only considered when no suitable package can be found, and then only by large companies with correspondingly deep pockets.

Most organisations would be better served by custom applications than by packages. Successful companies achieve their pre-eminence by virtue of the ways in which they differ from their competitors, not the ways in which they resemble them. Yet dependence on packaged applications has a homogenising effect on companies that use them.

Market leader SAP's flagship R/3 Enterprise Resource Planning (ERP) package comes complete with a Reference Model or Business Blueprint, which claims to embody twenty-five years of best-business practices in many different industries. SAP encourages its customers to re-engineer their businesses around the R/3 software, and not to stray from the business blueprint. The notion that it is appropriate to change a successful business to fit the dictates of a software package would have been anathema just a few years ago: now it is accepted as conventional wisdom. The business blueprint philosophy is flawed. Business blueprints reflect good historical practice, but more companies succeed by going beyond conventional wisdom than by recycling it. The Internet has already taught us that every established business model is vulnerable to new, wildly unconventional ways of doing business, facilitated by new technologies. Moreover, the idea that a software company knows better than you how your business should operate truly is as silly as it sounds. There are signs that attitudes are about to change once again. Recently the image of monolithic packages has been tarnished by some high-profile law suits and at least one financial collapse where the finger of blame is pointed at alleged mis-selling or shortcomings of ERP packages. Also, e-commerce is creating opportunities for new applications, and those who aim to be at the leading edge are likely to have to build significant pieces of their applications themselves. Moreover, the new millennium will free resources that have been tied up in addressing the Y2K problem. All these factors point to a resurgence of interest in custom applications, which will turn the spotlight back onto the cost and complexity of application development, and thus to reuse. Within the framework of the relational model, software reuse based on the relational model has failed to deliver the benefits that it has promised.

Within the associative model, metacode allows us to write omnicompetent programs that can operate on any and every business entity without modification. This substantially reduces the number of new programs needed for a new application. Also, as more applications are deployed, the proportion of new requirements that can be fulfilled by existing grams increases, so the number of new programs that have to be written decreases still further. Today, programmers continually have to re-invent the wheel by rewriting familiar programs to work with new tables. Breaking this cycle will significantly reduce the cost of computing.

The reusability of metacode means that many simple applications can be implemented using existing programs. This opens the door to a much greater involvement of end-users in the creation of applications. Once they become familiar with a core repertoire of Sentences programs, many end-users will be able to develop and deploy simple applications without any specialist help.

If Your Customers Are So Important, Why Store The Same Data About Each One?

Unlike a relational database, an associative database can readily record data that is unique to one thing of a particular type—one customer, one product and so on—without demanding that it be relevant to all other things of the same type. Also, via the metacode capability, applications that use associative databases can easily present, manipulate and query information that is unique to one particular thing.

In every field of industry, commerce and government, the quality of customer service and how to improve it in a cost-effective manner are near the top of management's agenda. The media focus on consumer affairs, together with the increasing availability of competitive information and analysis via advertising and the Internet, is encouraging consumers, both individual and corporate, to be more discerning and demanding in their purchases of both goods and services. In "The One-to-One Future", Peppers and Rogers claim that a key role of technology will be to put the customer rather than the vendor in charge of the buying process. Applications that can record only a standard menu of data items about each customer leave enterprises ill-equipped to meet such a future.

We have seen how the associative model's metacode capability allows us to write omnicompetent programs that are able to read and use schemas as they go. When we decide to store a new piece of information about a certain type of entity, we simply add it to the schema. The need to modify programs each time we add a column has gone away: the new information can be immediately understood and processed by our omnicompetent programs.

For example, suppose Avis is a new sales prospect who insists that, if we want its business, we must guarantee that its account balance with us will never exceed $10,000. No customer has ever asked for such a guarantee, so it isn't something that we currently support or that we want to offer more broadly, but we desperately want Avis's business. The answer is amend the schema solely for Avis to define the new limit:

Avis has balance limit Monetary value

Avis has balance limit $10,000

The Monetary value field will thus appear only on edit panels for Avis, so there is no risk that staff will begin to offer the capability more widely, or that any code we may create to operate on the balance limit will be applied more broadly that it needs to be. In the relational world, an enhancement like this for a single customer would simply be uneconomic, so we would lose the Avis account.

If Your Databases Are So Vital, Why Can't They Work Together?

For a programmer to enable users to view two relational databases together as though they were one requires a deep understanding of both databases and a significant amount of difficult programming. Each database has its own, unique data model. Event the most commonplace entities, such as customer, invariably have a different structure and different attributes based on different domains in different databases. It is as though two databases addressing the same problem domain were written in two entirely different languages—simply establishing and sharing what each one means by a concept as fundamental as a customer is almost prohibitively difficult.

And yet the need to view two databases as though they were one is an everyday requirement. Some examples: two applications have been developed separately, and now a third application that spans data used by both is to be developed; two companies are considering a merger, and want to know what proportion of their customers they have in common; the accounts of two subsidiary companies running on different systems need to be consolidated with their parent; a company has been acquired and its systems need to be subsumed into those of its new parent.

Suppose two systems analysts separately designed two databases to solve the same problem. The two databases would differ in many ways. They would contain different tables with different names, and even tables that did the same job would have different columns with different names based on different domains in a different order. Next suppose that the two databases were allowed to operate independently for several years—perhaps in two subsidiaries of a multinational—and then it was decided to amalgamate the subsidiaries and combine the databases. What would be involved?

Let's take the simplest case of two tables that clearly perform the same function: the two customer tables. We can't simply add the rows from one customer table to the other, because every row in a relation must have the same columns, and inevitably there will be at least one pair of columns that do not match. So we have to examine both tables and match up the corresponding columns. Even when we find columns whose functions clearly match, often they will be based on different domains. One designer may have chosen to identify customers by a number, and the other by an alphabetic string. We must chose one or the other, assign a new keys to the one that we don't chose, and then trawl through the entire database replacing foreign keys that point to the keys that we have replaced. All this work deals with just one column in one pair of matching tables, but the nature of the relational database design process means that many of the tables in one database will have no direct equivalent in the other, so the process that we have just described will often be the tip of the iceberg. Even when we stop short of merging databases—perhaps we need only to answer a simple question such as how many customers the two subsidiaries share in common—we have to go through this cross-referencing exercise before we can begin to find the answer to the question.

Most database management systems incorporate facilities to distribute databases across many computers. They can put some tables on one computer and others on another, or some rows of a table on one computer and others on another, or some columns of a table on one computer and others on another. The distributed database can be administered either as one database stored on many computers, or as separate, unconnected databases. But this doesn't help us to overcome our problems. If we administer the network as one database, we gain no benefit in return for the overhead other than some leeway in resource utilisation. If we administer it as separate databases, we are right back where we started. Distributed database capabilities typically solve only tactical problems, such as allowing one database to access to a table that already exists in another.

In "Data Warehouse—from Architecture to Implementation", Barry Devlin defines a data warehouse as "a single, complete and consistent store of data obtained from a variety of sources and made available to end users in a way they can understand and use in a business context." The discipline of data warehousing emerged in the 1990s, driven by the realisation that enterprises today often have large and increasing amounts of data but relatively little information. In many organisations, the computer systems infrastructure typically evolves in a piecemeal fashion, often driven by tactical needs within departments. The personal computer has exacerbated this tendency by allowing individuals to create small applications in spreadsheets and personal databases for use by themselves or their workgroup. This bottom-up evolution of infrastructure tends to create disjoint islands of information that are never connected or correlated.

It is issues like these that have spawned the data warehousing industry, which provides tools and techniques to extract data from many individual databases and gather it together into a single, cross-referenced central database that can be used for query and analytical purposes. But there are drawbacks. A data warehouse is costly to set-up and maintain, in terms of specialised human resources, tools that must be purchased and hardware to duplicate all the data. Also the process can be so time-consuming that the data in the warehouse is weeks or months old. Whilst it can still be very useful, as competition increases reaction time becomes ever more important, and managers do not always trust data that is less than current.

Combining two relational databases is like trying to combine two books written in different languages: before you can start on the useful work you have to translate one of them into the language of the other. As we saw above, before we can even begin to combine or correlate two different relational databases we must find and compare matching tables and columns, resolve differences, and decide what to do about tables and columns that simply don't match. By contrast, combining two associative databases is like putting together two documents both written in English on the same word processor. You can immediately add one to the other with no preparation. The result will be perfectly comprehensible, and will answer more questions than did either text on its own. If the two databases are to remain as one, the user can then can edit and enhance the combined whole to establish common definitions and remove ambiguities.

Associative databases can always be combined with no preparation because the associative model uses one consistent form—items and links—for all types of data and metadata. Every associative database has the capability of being self-defining: that is, of carrying its own definition within itself. Where two databases have used dissimilar names—perhaps in different languages—for identical types of data or individual data items, users can associate equivalent types and data items to resolve ambiguity simply by adding extra links:

Customer is equivalent to Client
  Delivery address is equivalent to Shipping address
  BT is equivalent to British Telecom
  Entity types that perform essentially the same function will usually have different sets of data items in each database, but, unlike the relational model, the associative model does not insist that all entities of one type have the same set of data items and does not allocate space for missing data items, so this is not an issue.

This capability of the associative model allows information in different databases to be correlated without the need for the additional costs of data warehousing, and permits separate databases to be readily combined. Individual databases and related networks of databases may also be distributed across networks and the Internet in any configuration without any administrative or programming overhead, allowing complete freedom of resource utilisation.

While the invention has been disclosed in connection with the embodiments shown and described in detail, various equivalents, modifications, and improvements will be apparent to one of ordinary skill in the art from the above description. Such equivalents, modifications, and improvements are intended to be encompassed by the following claims.

I claim:

1. A system for storing data, comprising
a plurality of entities, each entity representing an item having a discrete, independent existence, and
a plurality of associations, defining nexuses between pairs of said entities, nexuses between pairs including one of said entities and one of said plurality of associations, and nexuses between pairs of said associations.

2. The system of claim 1, wherein each entity is given a unique identifier and each association is given a unique identifier.

3. The system of claim 1, wherein the plurality of associations includes a correcting association which defines one nexus as correcting a previous nexus.

4. The system of claim 1, wherein the plurality of associations includes an updating association which defines one nexus as updating a previous nexus.

5. The system of claim 4, wherein the updating association includes a time from which the updating association is effective.

6. The system of claim 1, wherein the plurality of entities includes an entity representing an abstract category.

7. The system of claim 1, wherein the plurality of associations includes an association defining a nexus between at least two abstract categories.

8. The system of claim 1, wherein one of the plurality of associations defines a nexus between two entities which represent one item.

9. The system of claim 8, wherein the nexus between the two entities which represent one item is equivalence.

10. The system of claim 1, wherein one of said plurality of associations defines a nexus between a first of said entities and a second of said entities, the nexus representing an attribute of said first entity and said second entity.

11. The system of claim 10, wherein said one association comprises a verb to define said nexus representing said attribute.

12. The system of claim 1, wherein one of said plurality of associations defines a nexus between a third of said entities and another of said plurality of associations, the nexus representing an attribute of said third entity and other association.

13. A system for storing data, comprising
a data chapter having two data tables,
a first of said data tables storing a plurality of entities, each said entity comprising
an arbitrarily assigned unique identifier and
a name, and
a second of said data tables storing a plurality of links, each said link defining an association between a source and a target mediated by a verb, the source and target being one of the entities and links, the verb being one of the entities, each link comprising
an arbitrarily assigned unique identifier for said link,
the unique identifier for the source,
the unique identifier for the verb, and
the unique identifier for the target.

14. The system of claim 13, wherein the plurality of links includes an updating link which defines an existing association as being superseded by a subsequent association.

15. The system of claim 14, wherein the plurality of links further includes a temporal link which indicates a time at which the updating link takes effect.

16. The system of claim 13, wherein the plurality of entities includes an entity representing an abstract category.

17. The system of claim 13, wherein one of the plurality of links defines an association between two entities which represent one unique item.

18. The system of claim 17, wherein the association between the two entities is equivalence.

19. The system of claim 13, comprising a plurality of said data chapters, each said unique identifier for a source, a verb, and a target being prefixed with an identifying element indicating which of said plurality of data chapters holds the data table containing the respective source, verb and target.

20. The system of claim 19, wherein each of said plurality of chapters comprises a chapter address table storing for each of said plurality of chapters said identifying element and an address for said chapter.

21. A method for storing data, comprising
providing a plurality of entities, each entity representing an item having a discrete, independent existence, and
creating a plurality of associations, defining nexuses between pairs of said entities, nexuses between pairs including one of said entities and one of said plurality of associations and nexuses between pairs of said associations.

22. The method of claim 21, further comprising
assigning to each entity a unique identifier and
assigning to each association a unique identifier.

23. The method of claim 21, wherein creating a plurality of associations includes creating a correcting association which defines one nexus as correcting a previous nexus.

24. The method of claim 21, wherein creating a plurality of associations includes creating an updating association which defines one nexus as updating a previous nexus.

25. The method of claim 24, wherein creating a updating association includes assigning a time from which the updating association is effective.

26. The method of claim 21, wherein creating a plurality of entities includes creating an entity representing an abstract category.

27. The method of claim 21, wherein creating a plurality of associations includes creating an association defining a nexus between at least two abstract categories.

28. The method of claim 21, further comprising creating an association between two entities which represent one item.

29. The method of claim 28, wherein the association between the two entities defines the two entities as equivalent.

30. The method of claim 21, wherein one of said plurality of associations is created to define a nexus between a first of said entities and a second of said entities to represent an attribute of said first entity and said second entity.

31. The method of claim 21, wherein one of said plurality of associations is created to define a nexus between a third of said entities and another of said plurality of associations to represent an attribute of said third entity and said other association.

32. A method for storing data, comprising
creating a data chapter having two data tables,
storing in a first of said data tables a plurality of entities, each said entity comprising
an arbitrarily assigned unique identifier and
a name, and
creating in the second of said data tables a plurality of links, each said link defining an association between a source and a target mediated by a verb, the source and target being one of the entities and links, the verb being one of the entities, each link comprising
an arbitrarily assigned unique identifier for said link,
the unique identifier for the source,
the unique identifier for the verb, and
the unique identifier for the target.

33. The method of claim 32, wherein creating a plurality of links includes creating an updating link which defines one association as being superseded by a subsequent association.

34. The method of claim 32, wherein creating a plurality of links further includes creating a temporal link which indicates a time at which the updating link takes effect.

35. The method of claim 32, wherein storing a plurality of entities includes creating an entity representing an abstract category.

36. The method of claim 32, wherein creating a plurality of links includes creating a link defining an association between a verb and at least two items representing abstract categories.

37. The method of claim 32, further comprising
linking two entities which represent one unique item by a link that defines an association between the two entities as equivalent.

38. The method of claim 32, comprising creating a plurality of said data chapters, and prefixing each said unique identifier for a source, a verb, and a target with an identifying element indicating which of said plurality of data chapters holds the data table containing the respective source, verb and target.

39. The method of claim 38, comprising creating a chapter address table in each chapter and storing in said address table for each of said plurality of chapters said identifying element and an address for said chapter.

40. A system for storing data, comprising
a plurality of entities, each of said plurality of entities being assigned a unique identifier automatically by the system on creation of the entity, and
a plurality of associations, defining nexuses between pairs of said entities, nexuses between pairs including one of said entities and one of said plurality of associations, and nexuses between pairs of said associations,
each of said plurality of associations being assigned a unique identifier automatically by the system on creation of the association.

* * * * *